United States Patent [19]
Musha et al.

[11] Patent Number: 5,804,814
[45] Date of Patent: Sep. 8, 1998

[54] OPTICAL PICK-UP HEAD AND INTEGRATED TYPE OPTICAL UNIT FOR USE IN OPTICAL PICK-UP HEAD

[76] Inventors: Toru Musha; Akihiko Yoshizawa; Hiroyuki Imabayashi; Hiroshi Miyajima, all c/o Intellectual Property & Legal Department, Olympus Optical Co., Ltd., 2-3, Kuboyama-cho, Hachioji-shi, Tokyo, Japan

[21] Appl. No.: 447,208

[22] Filed: May 22, 1995

[30] Foreign Application Priority Data

| May 20, 1994 | [JP] | Japan | 6-107065 |
| Jul. 14, 1994 | [JP] | Japan | 6-162291 |
| Jul. 22, 1994 | [JP] | Japan | 6-171107 |
| Sep. 26, 1994 | [JP] | Japan | 6-229597 |

[51] Int. Cl.$^6$ .................................................. G01J 1/20
[52] U.S. Cl. ................... 250/201.5; 369/112; 369/44.23
[58] Field of Search ............................ 250/201.5, 225; 369/109, 110, 112, 121, 44.11, 44.14, 44.23, 44.37

[56] References Cited

U.S. PATENT DOCUMENTS

| 3,969,576 | 7/1976 | Boonstra et al. | 250/201.5 |
| 4,037,929 | 7/1977 | Bricot et al. | 369/110 |
| 4,885,734 | 12/1989 | Yuzo | 369/44.23 |
| 5,353,267 | 10/1994 | Nakamura et al. | 250/201.5 |
| 5,493,555 | 2/1996 | Kimura et al. | 369/112 |
| 5,541,906 | 7/1996 | Kobayashi | 369/44.23 |

FOREIGN PATENT DOCUMENTS

| 62-197931 | 9/1987 | Japan . |
| 62-283430 | 12/1987 | Japan . |
| 344086A | 2/1991 | Japan . |
| 5314563A | 11/1993 | Japan . |

Primary Examiner—Stephone Allen

[57] ABSTRACT

An optical pick-up head for reading writing information from on a magneto-optical record medium including a semiconductor laser, a multi-image plane parallel plate for separating an incident light beam emitted by the semiconductor laser from a return light beam reflected by the optical record medium and dividing the return beam transmitted through and refracted by the multi-image plane parallel plate into a plurality of return light beams, and a signal detecting photodetector receiving a plurality of return light beams, wherein the multi-image plane parallel plate is formed by first and second prisms made of birefringent material and is arranged such that major and minor axes of astigmatism introduced by the plane parallel plate are inclined by 45° with respect to an information track. An optic axis of the first prism is set such that the return beam is separated into ordinary and extraordinary light beams having identical intensities and an optic axis of the second prism is rotated with respect to the optic axis of the first prism. The optical elements are positioned and mounted on a mounting substrate having guide walls formed by a photolithography.

5 Claims, 32 Drawing Sheets

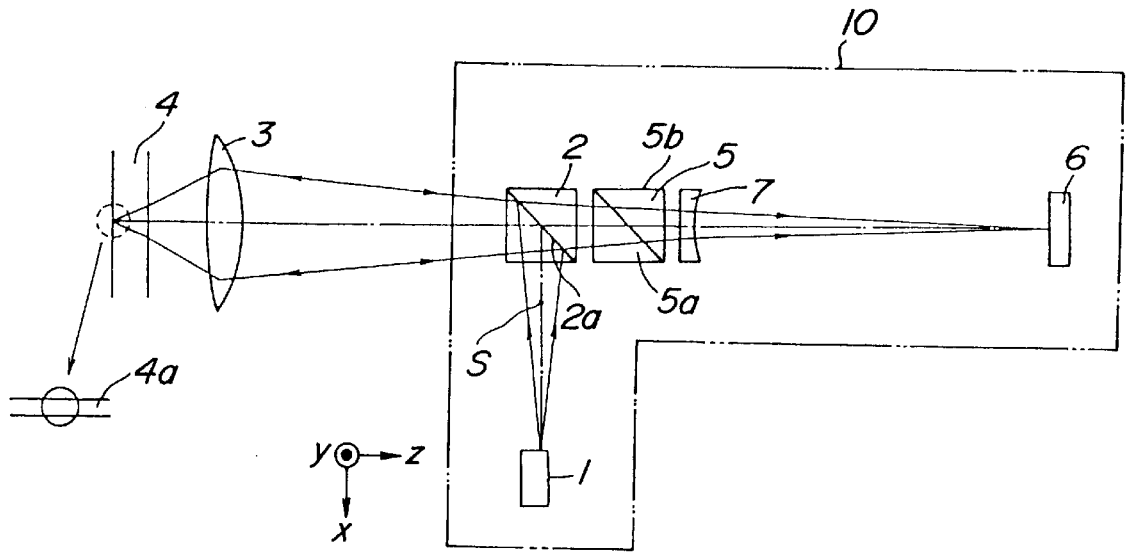
FIG_1
PRIOR ART
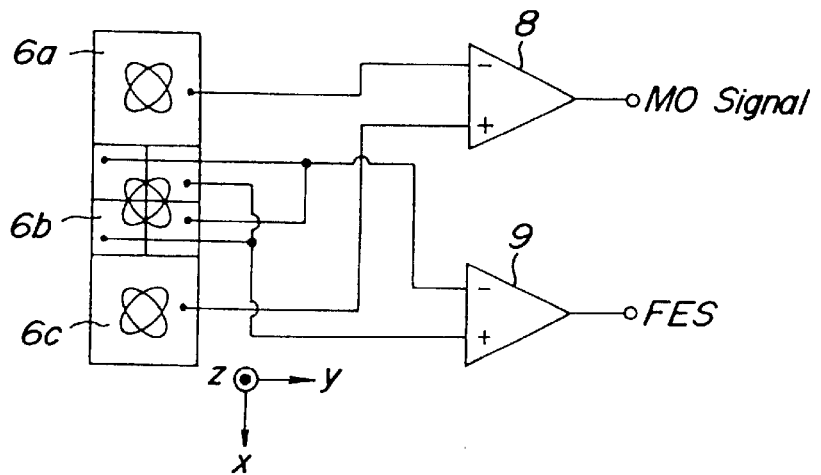
FIG_2
PRIOR ART

FIG_11

FIG_13
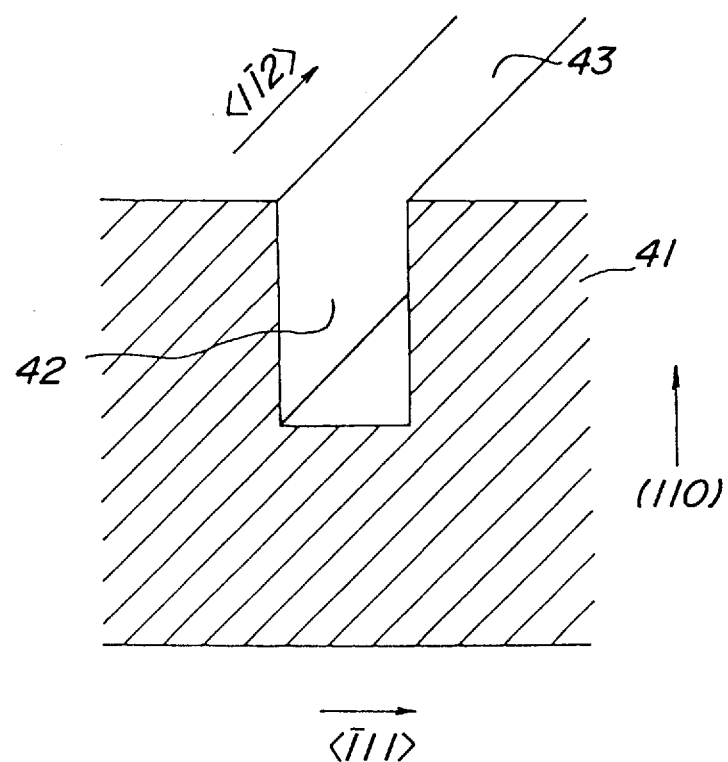

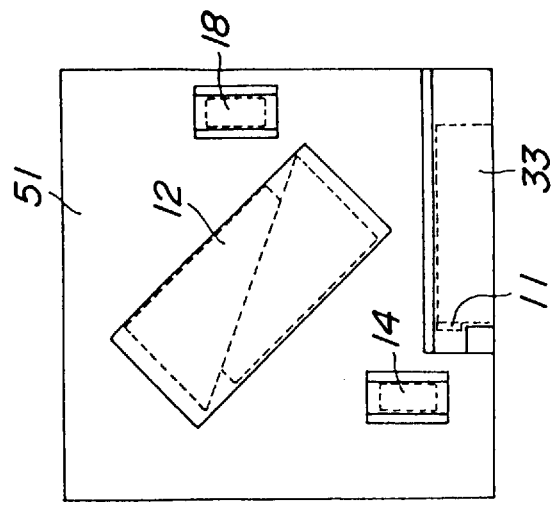
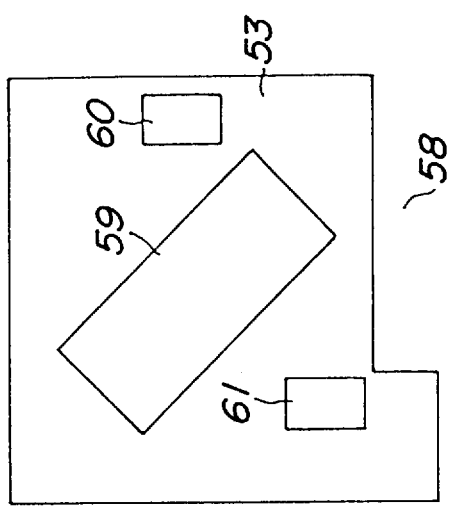
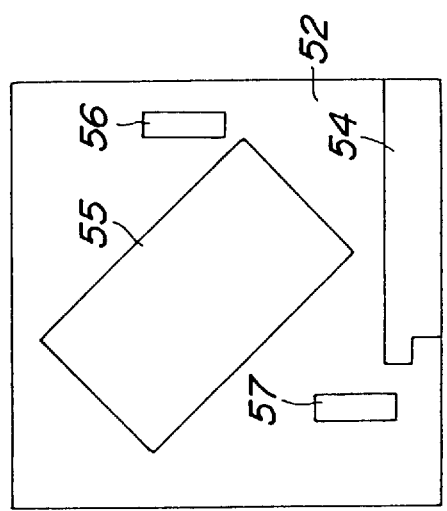

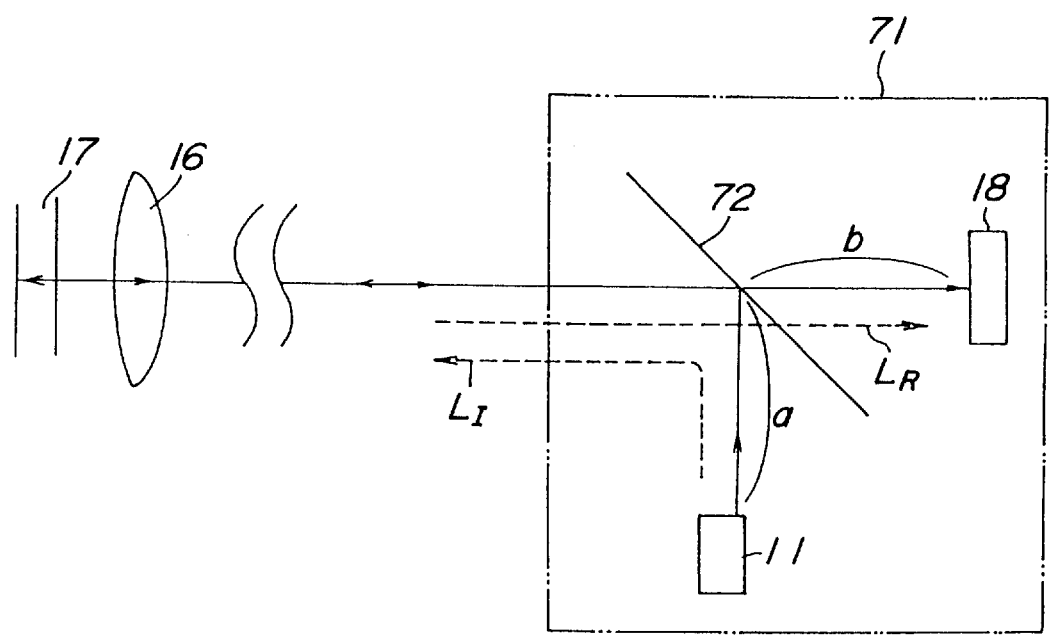
FIG_15

FIG._17
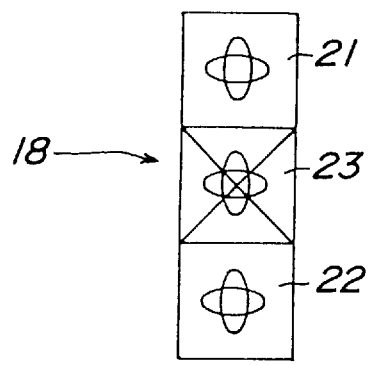
FIG._18A
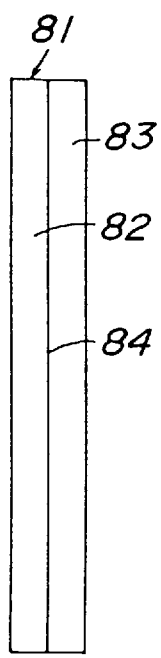
FIG._18B
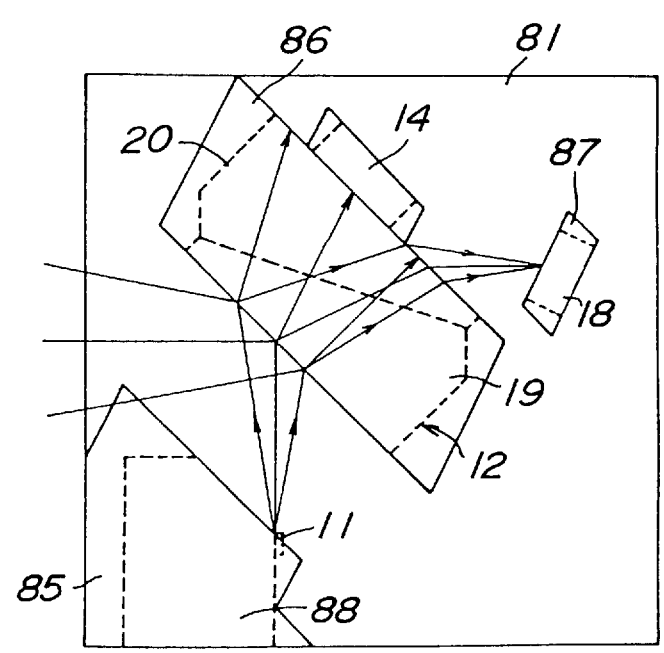
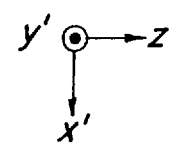

FIG_19A
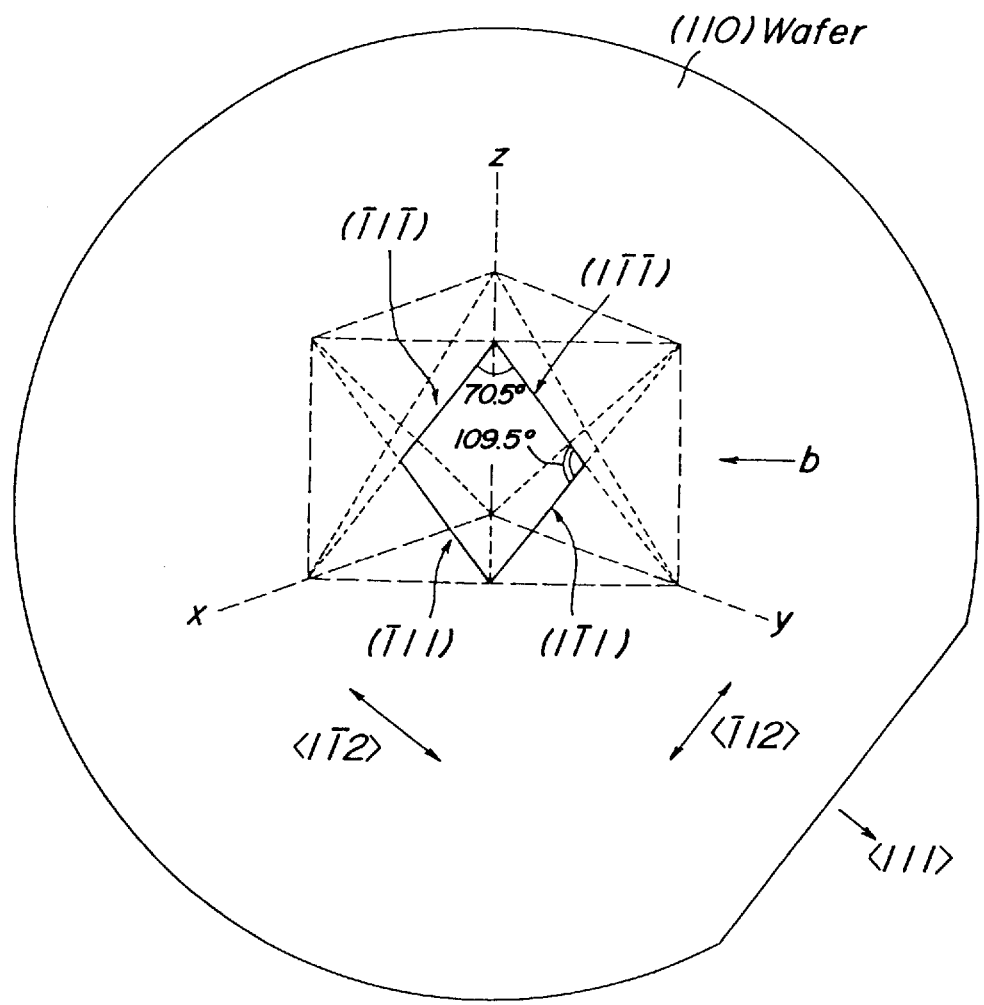
FIG_19B
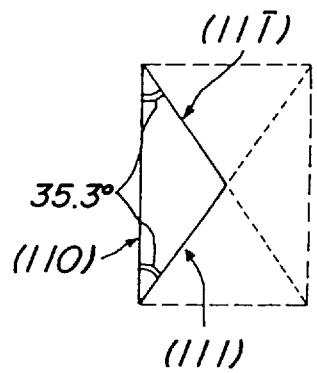

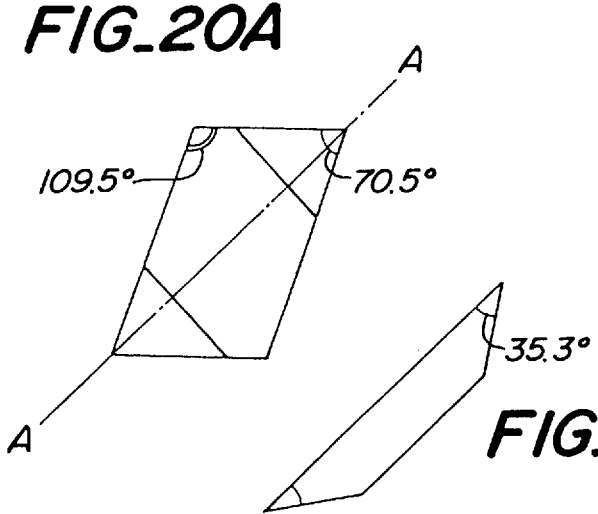
FIG. 20A
FIG. 20B
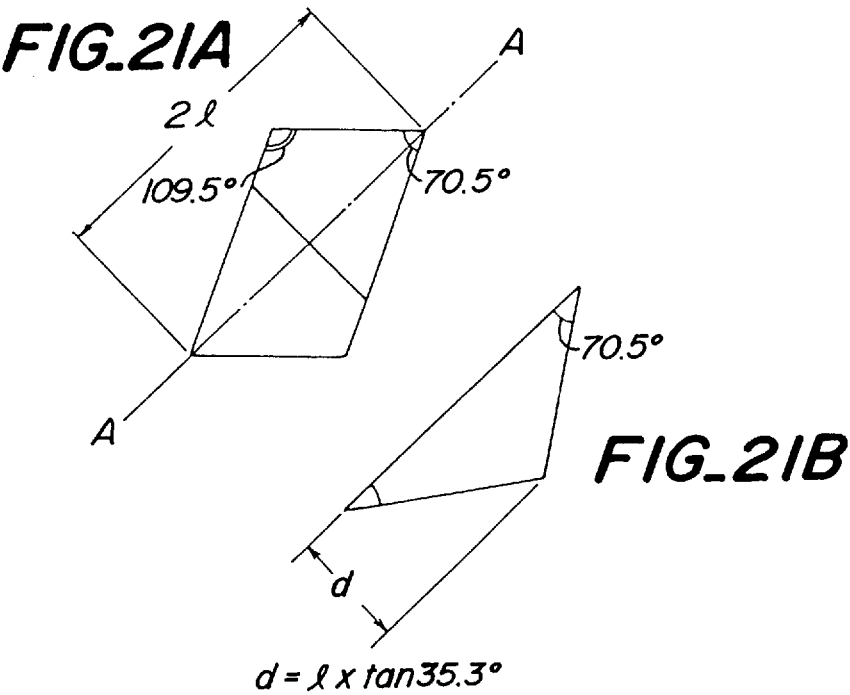
FIG. 21A
FIG. 21B
$d = \ell \times \tan 35.3°$ FIG_22
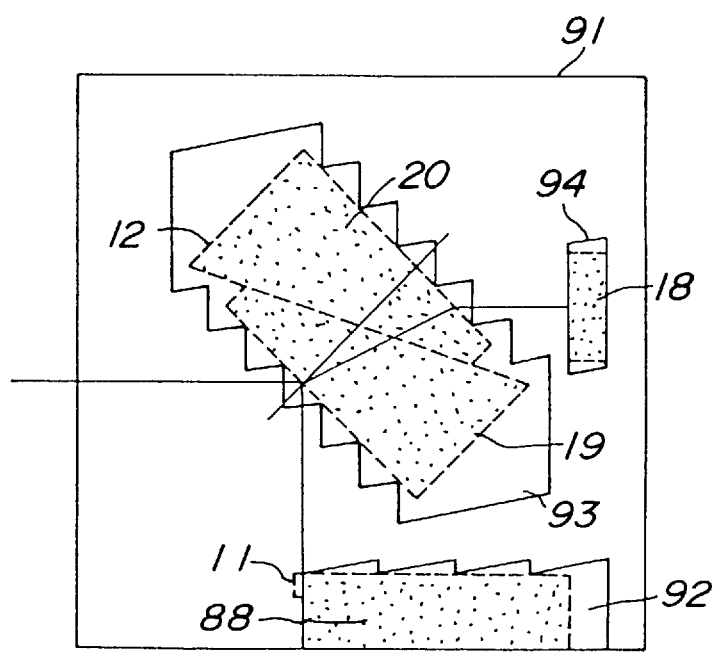

FIG_23A
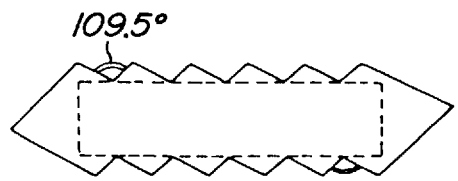
FIG_23B
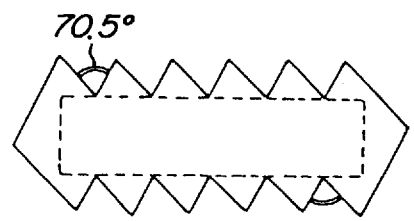
FIG_23C
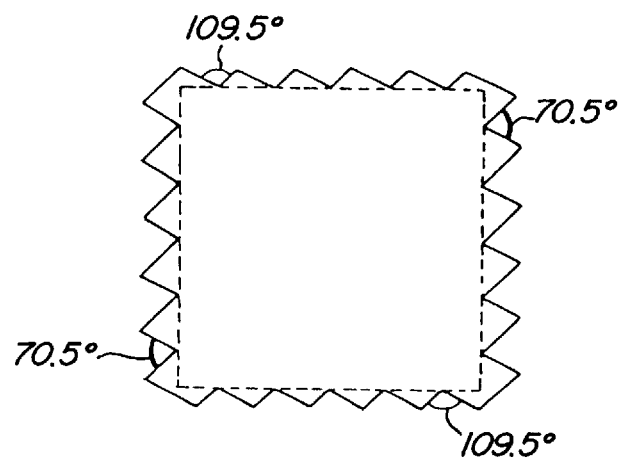

FIG._24A
FIG._24B
FIG._24C
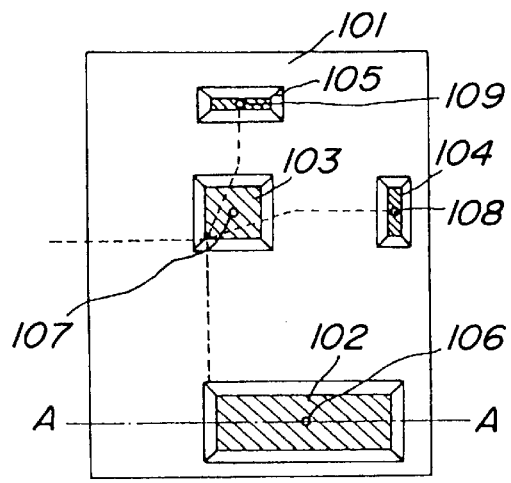
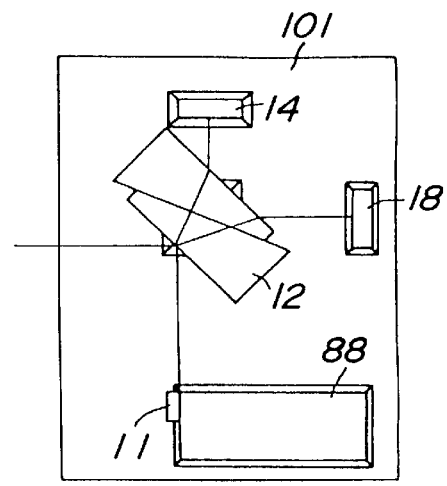
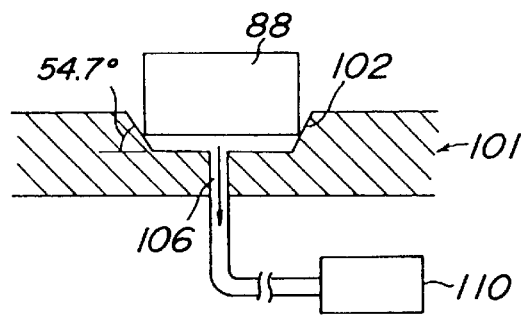

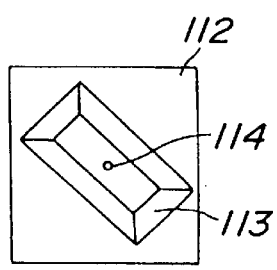
FIG._26A
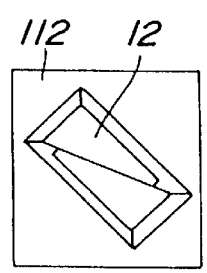
FIG._26B
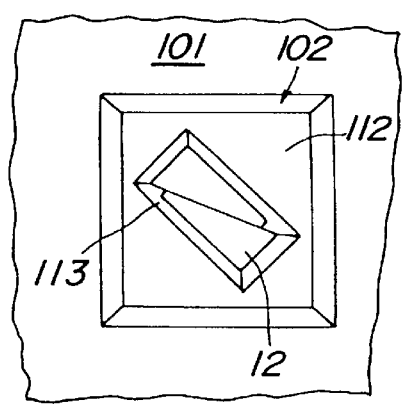
FIG._26C

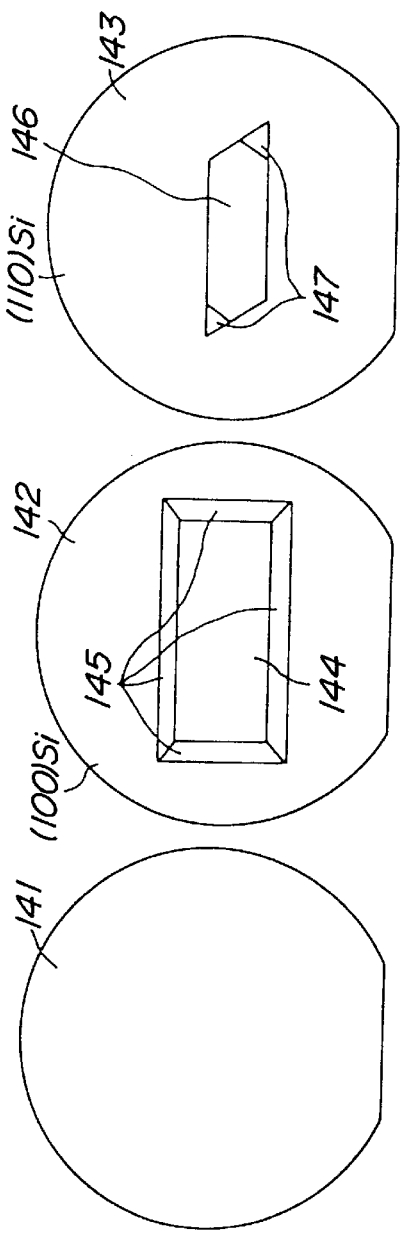

FIG_29A
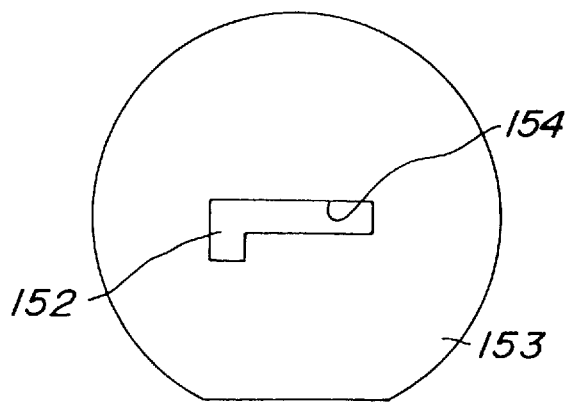
FIG_29B
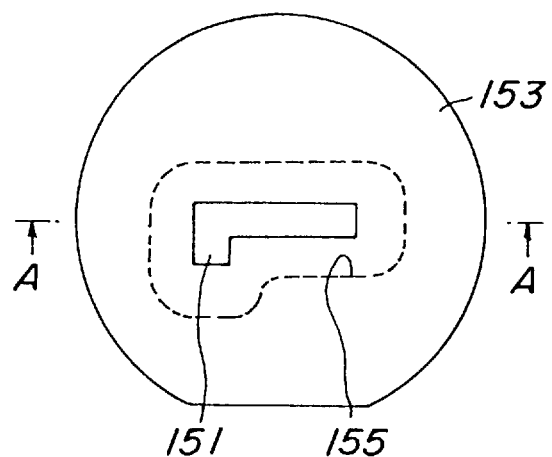
FIG_29C
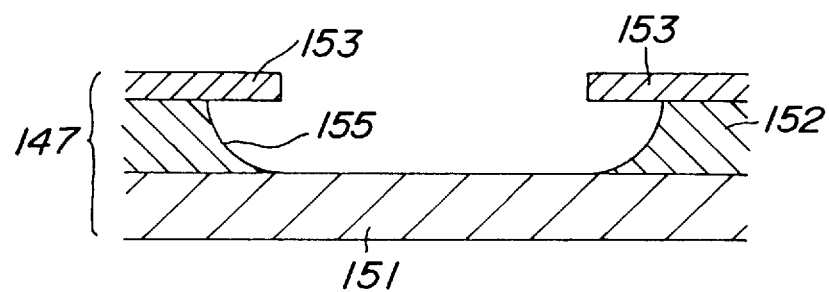

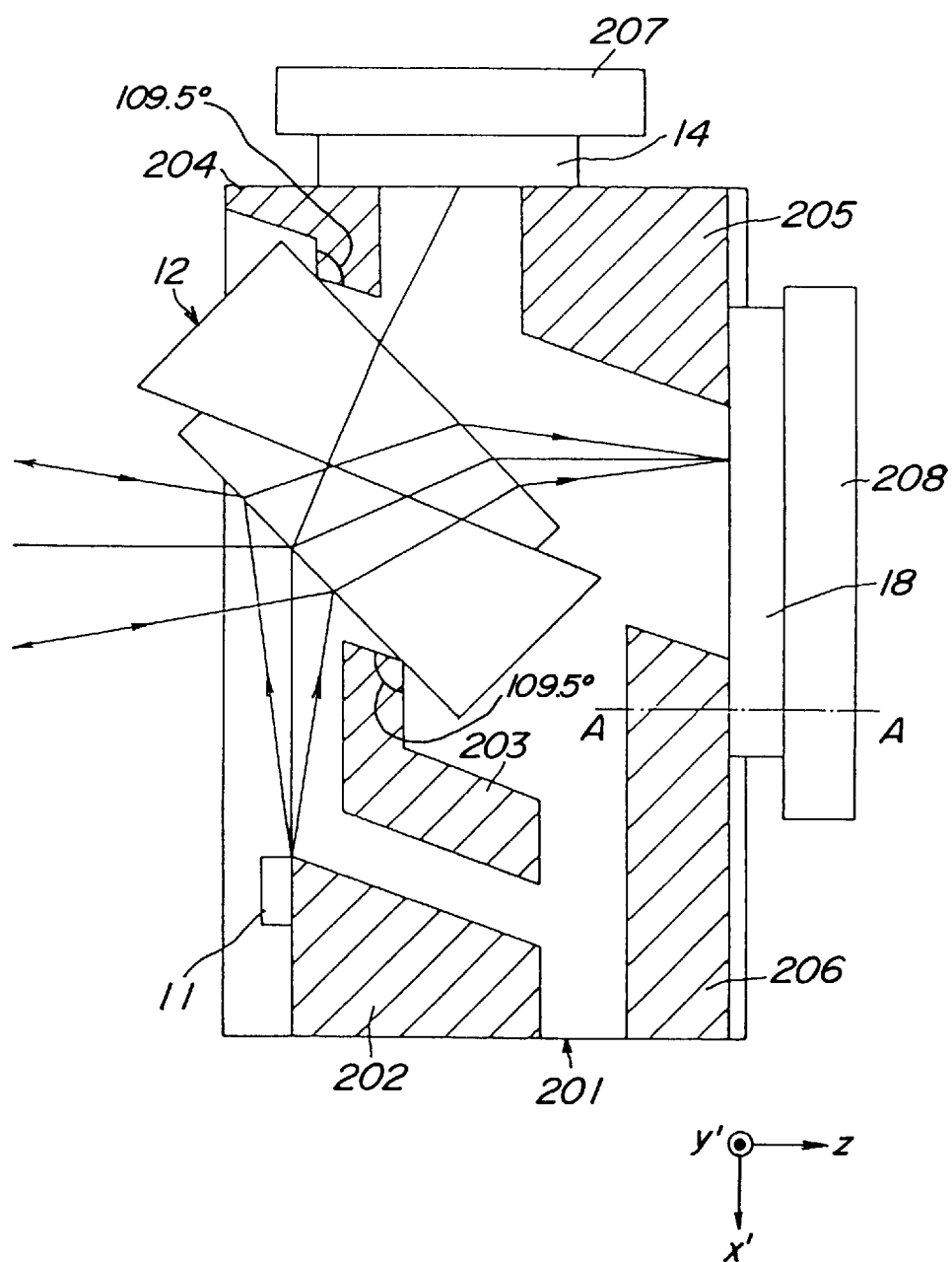
FIG_30

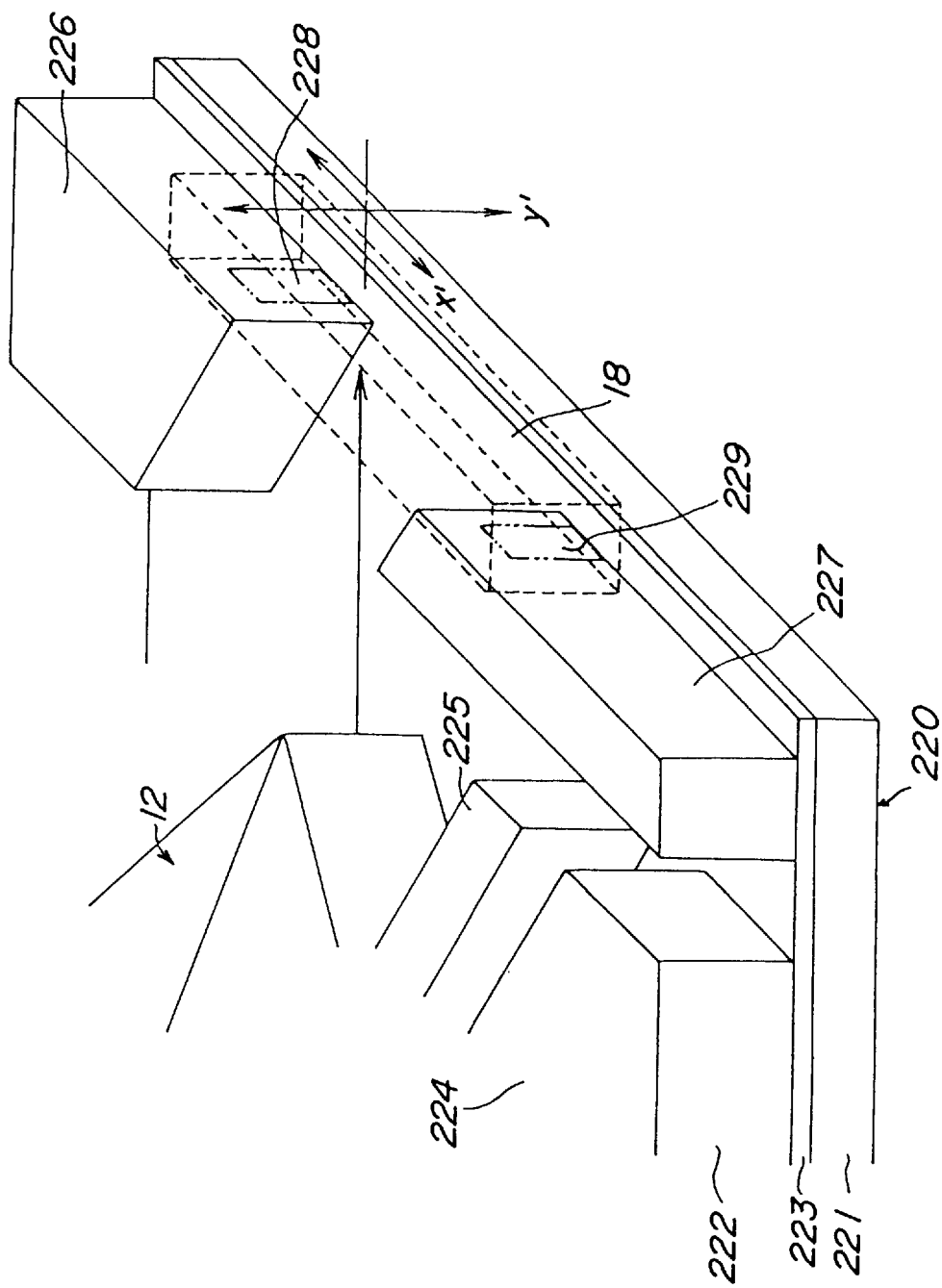
FIG._31

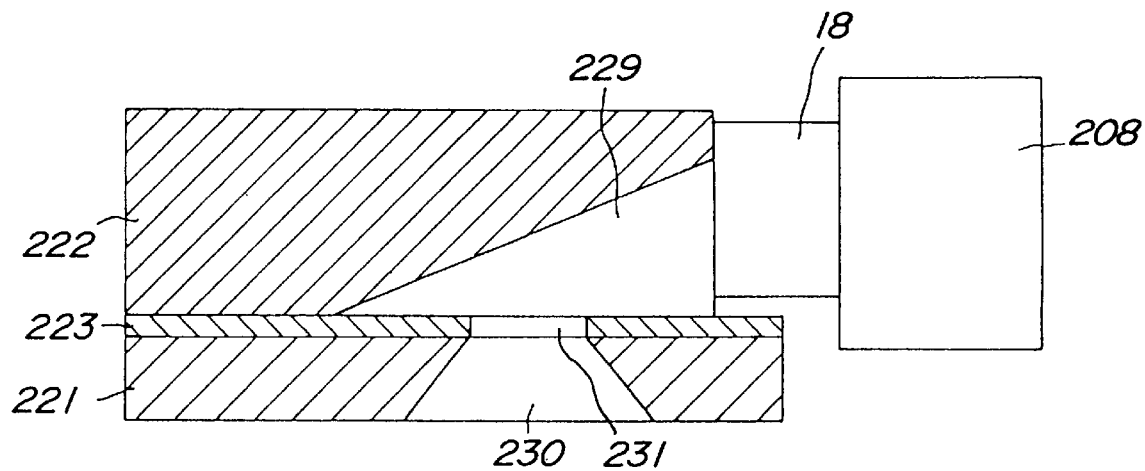
FIG_32

FIG_33A    FIG_33B
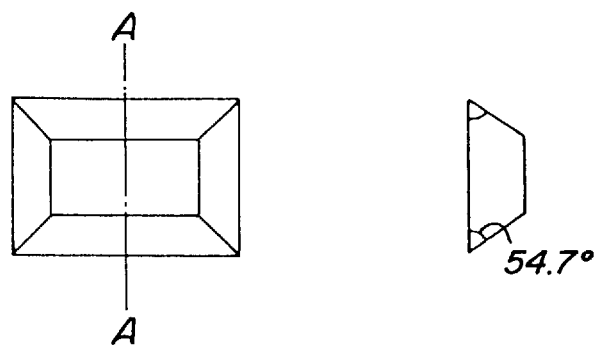
FIG_34A    FIG_34B
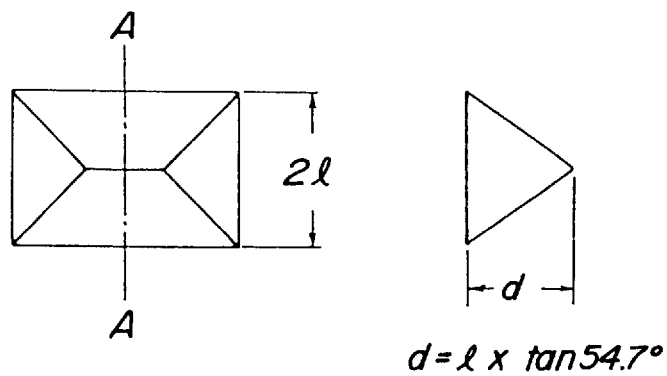
$d = \ell \times \tan 54.7°$

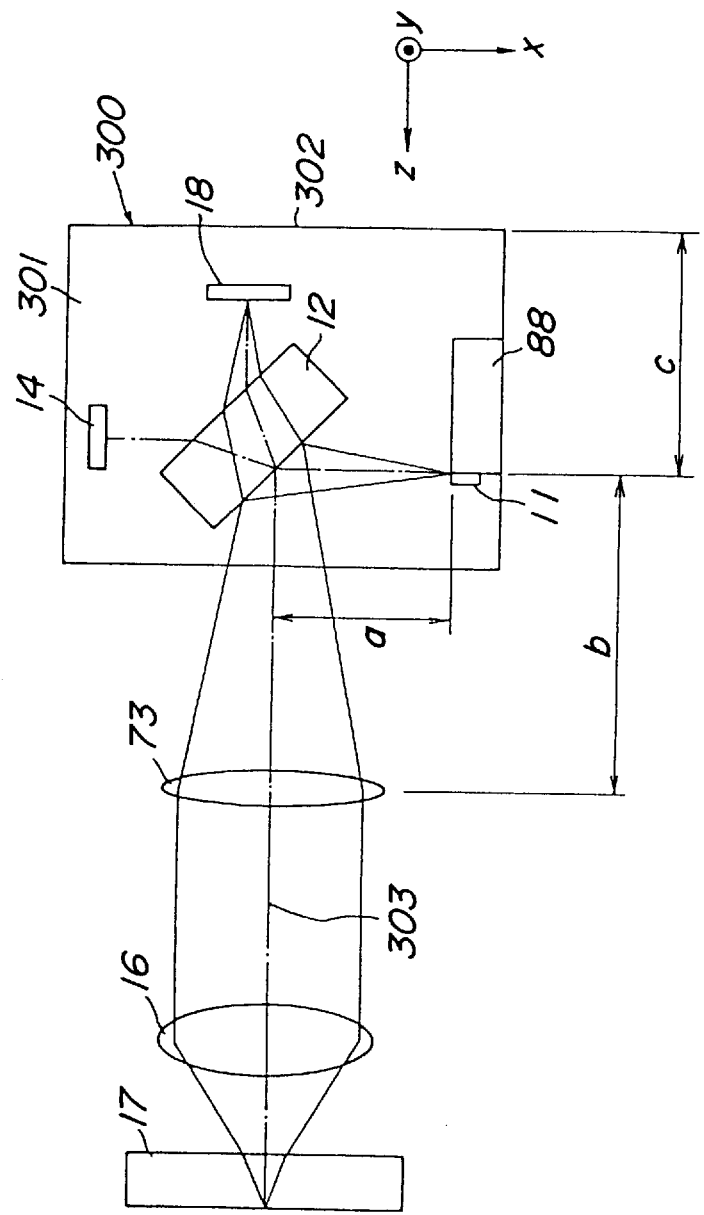
FIG._36A
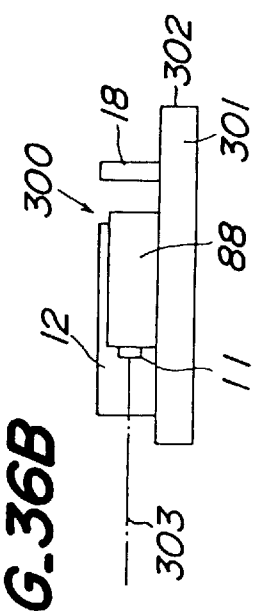
FIG._36B

FIG_39A
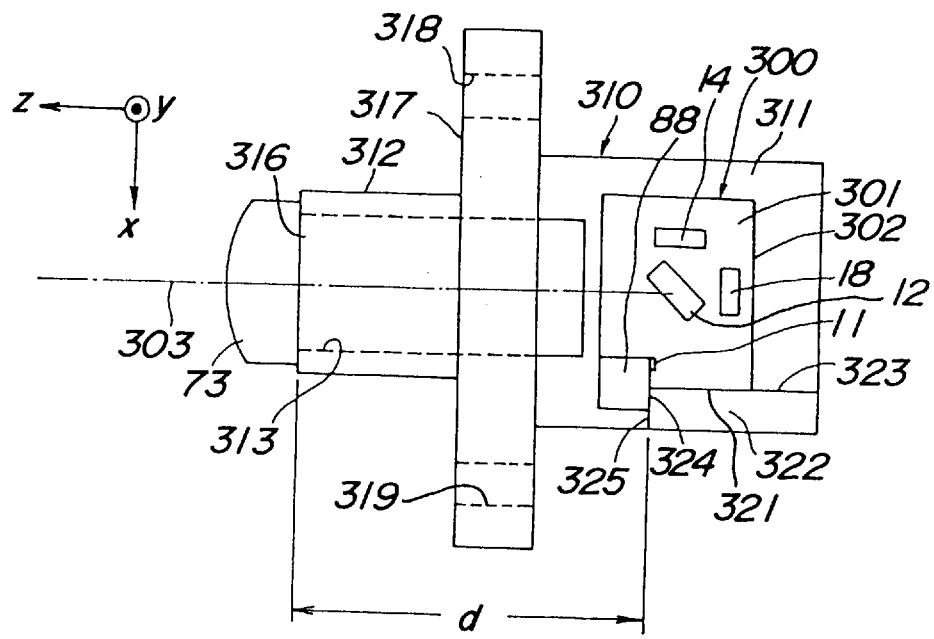
FIG_39B
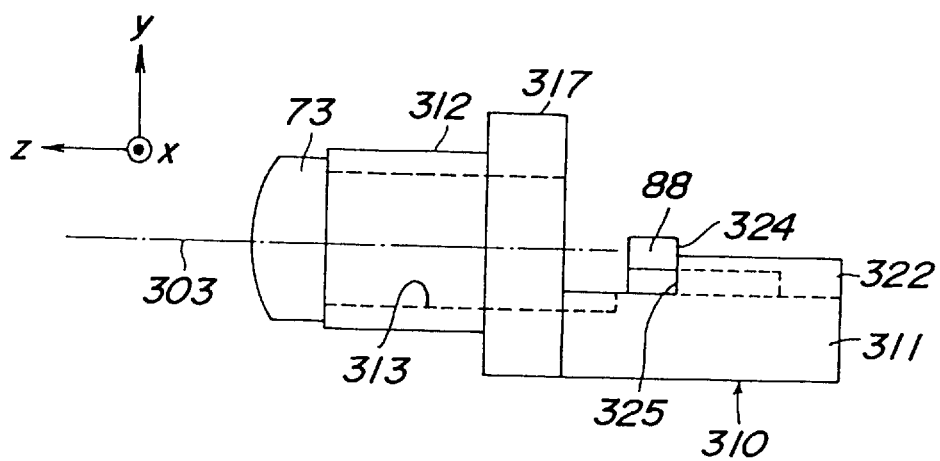

FIG_40A
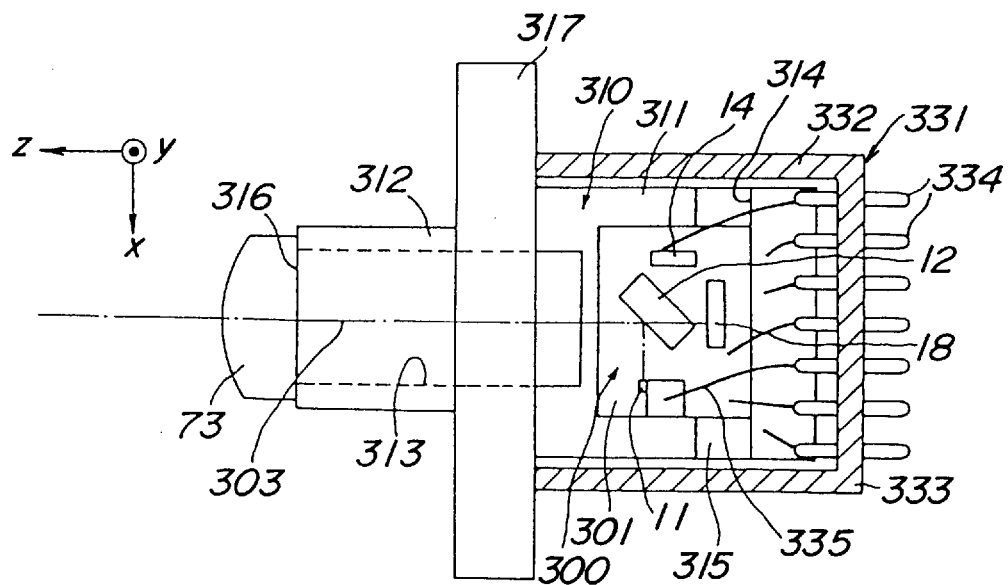
FIG_40B
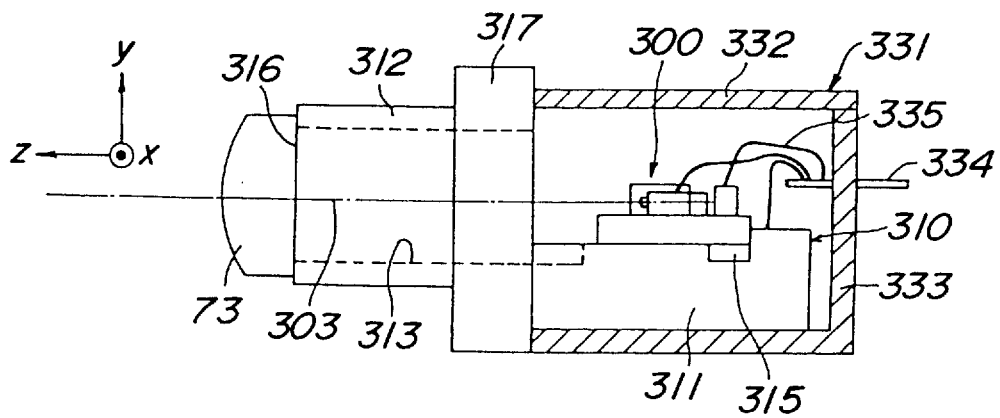

OPTICAL PICK-UP HEAD AND INTEGRATED TYPE OPTICAL UNIT FOR USE IN OPTICAL PICK-UP HEAD

BACKGROUND OF THE INVENTION

1. Field of the Invention

The present invention relates to an optical pick-up head for use in an optical reading and/or recording apparatus for reading and/or recording information from and/or on an optical information record medium, particularly a magneto-optical record medium. The present invention also relates to an integrated type optical unit for use in the above mentioned optical pick-up head.

2. Related Art statement

FIG. 1 is a schematic view showing a first known optical pick-up head. The optical pick-up head reads and/or records information from and/or on a magneto-optical record medium. A linearly polarized laser beam emitted by a semiconductor laser such as a laser diode 1 is made incident upon a polarizing beam splitter 2 and a laser beam reflected by a polarizing film 2a provided in a contact surface between prisms is projected by an objective lens 3 onto an information track 4a of an magneto-optical information record medium 4 as a fine spot. The polarizing film 2a or the polarizing beam splitter 2 has a transmissivity of 60–90% for a component vibrating in a direction perpendicular to a plane of the drawing of FIG. 1 (S-polarized beam) and a transmissivity of substantially 100% for a component vibrating in a direction parallel with the plane of the drawing (P-polarized beam). Such a polarizing film 2a may be formed by a multiple coatings of dielectric material films. The linearly polarized laser beam emitted by the semiconductor laser 1 is made incident upon the polarizing film 2a as S-polarized beam.

The laser beam is reflected by the magneto-optical record medium 4 is subjected to the Kerr rotation and its polarizing direction is rotated about an optical axis by $\pm\theta_k$ depending upon information recorded on the record medium, The thus reflected return beam is converged by the objective lens 3 and is made incident again upon the polarizing beam splitter 2 as the converging light beam. Then, the return beam is transmitted through the polarizing film 2a so that the return beam is separated from the incident laser beam. Then, the return beam is made incident upon a multi-image prism 5. The multi-image prism 5 is consisting of a first triangular prism 5a and a second triangular prism 5, each being made of birefringent material. In order to detect an information signal recorded on the magneto-optical record medium 4 by a so-called differential method, an optic axis of the first prism 5a is set to be perpendicular to an optical axis of the return beam and to be inclined by 45° with respect to a direction perpendicular to the plane of the drawing, and an optic axis of the second prism 5b is set to be inclined by 45° with respect to the optic axis of the first primes in, for instance in the direction perpendicular to the plane of the drawing. Therefore, the return beam impinging upon the multi-image prism 5 is divided into substantially three light fluxes. The information signal read out of the optical record medium is denoted as MO signal for sake of simplicity.

The three light fluxes emanating from the multi-image prism 5 are then made incident upon a signal detecting photodetector 6 via a toric lens 7. The toric lens 7 has a function for extending a focal length of the transmitted light as well as a function as a cylindrical lens for introducing astigmatism which is required to detect a focusing error signal (hereinafter the focusing error signal is called FES).

As illustrated in FIG. 2, the signal detecting photodetector 6 comprises three light receiving units 6a, 6b and 6c, and the middle light receiving unit 6b includes four light receiving regions, The MO signal is derived from a comparator 8 producing a difference between outputs of the light receiving units 6a and 6c, and the FES is obtained from a comparator 9 producing a difference between a sum of outputs of diagonally aligned light receiving regions of the light receiving unit 6b and a sum of outputs of other diagonally aligned light receiving regions. A tracking error signal (denoted by TES) may be derived by, for instance a push-pull (PP) method.

In Japanese Patent Application Laid-open Publication Kokai Hei 5-314563, there is disclosed a second known optical pick-up head, In this optical pick-up head, in a converged return beam there is arranged a plane parallel plate having an optical anisotropy, said plane parallel plate having a function of separating the return beam from the incident beam, a function of performing the polarizing separation for detecting the MO signal by the differential method, and a function of introducing astigmatism for detecting the FES. Ordinary light and extraordinary light separated by the plane parallel plate are received separately by a signal detecting photodetector.

The above mentioned first known optical pick-up head has the following problems:

(1) The polarizing beam splitter 2 for separating the return light path from the incident light path, the multi-image prism 5 for dividing the return beam into a plurality of light fluxes with the aid of the polarization, and the toric lens 7 for introducing the astigmatism required for detecting the FES are arranged separately from each other, and thus the optical pick-up head could not be made light in weight, small in size and cheap in cost.

(2) The semiconductor laser 1 and signal detecting photodetector 6 which are arranged in conjugate with one another are spatially separated from each other by a large distance, and thus the optical pick-up head is liable to be subjected to temperature variation, secular variation, and others, so that use of the optical head is limited by ambient conditions, In order to mitigate such a drawback, it is required to use a large and expensive housing incorporating the optical elements.

(3) An optical path length of the detecting optical system is increased by a concave lens function of the toric lens 7, so that size of the optical head is prolonged, although adjustment of the signal detecting photodetector 6 becomes easy.

In the second known optical pick-up head, the plane parallel plate having optical anisotropy has all the three functions, i.e. separating the return beam from the incident beam, polarizing beam splitting function and astigmatism introducing function, the above mentioned problems (2) and (3) of the first known optical pick-up head can be mitigated. However, the second known optical pick-up head has the following problems:

(4) A direction in which the astigmatism for detecting the FES is introduced is in parallel with a track direction in which an information track extends or is perpendicular to the track direction. Therefore, a push-pull signal for detecting the tracking error is leaked into the FES and the focusing servo is liable to be unstable.

(5) The FES is detected only from one of the polarizing split beams, and thus an amplitude of the FES fluctuates due to a birefingency of a substrate of the magneto-optical record medium and an accurate focus servo control could not be performed, (6) A positioning of the signal detecting photodetector is difficult, (7) In the first known optical pick-up head shown in FIGS. 1 and 2, the number of optical elements is large, so that a total error represented by a sum of errors of respective optical elements becomes very large. In order to absorb these errors, the photodetector 6 has to be adjusted in xyz axes or the photodetector has to be adjusted in xy axes and the toric lens 7 has to be adjusted in z axis. In this manner, it is required to perform a very cumbersome three axis adjustment. In this case, the xy axis adjustment could not be independent from the z axis adjustment, so that a number of adjusting steps are increased.

(8) Moreover, since the number of optical elements provided within a portion 10 surrounded by a chain line in FIG. 1 is large, an actual size of the portion 10 amounts to several tens to several hundreds millimeters by considering a space for providing adjusting mechanisms. Therefore, it is required an expensive housing consisting of a several blocks and complicated workings are required in order to manufacture these blocks.

In known optical pick-up heads, a housing for accommodating the optical elements is manufactured by a mechanical process by using lathe, miller and NC lathe, and then the optical elements are fixed to the housing by means of screws and adhesive agent, Therefore, the housing is liable to become large and moreover positioning errors of the optical elements could be hardly limited to micron order.

In Japanese Patent Application Laid-open Publications Kokai Sho 62-197931 and 62-283430, there is disclosed a third known optical pick-up head. In this optical pick-up head, on a semiconductor substrate having photo diodes formed therein there are provided a beam splitter and a laser diode to constitute a single integrated body. This optical pick-up head can reduce a cost and a size. Moreover, in Japanese Patent Application Laid-open Publication Kokai Hei 3-44086, there is proposed a laser unit for use in the optical pick-up head. In this laser unit, a laser diode is sealed within a housing in which a collimator lens is provided.

If the above mentioned third known optical pickup head in applied to an infinite optical system using the collimator lens, it is necessary to adjust positions of a substrate on which the beam splitter and laser diode are secured with respect to an optical axis of the collimator lens, and this requires an adjusting mechanism and fixing parts therefor as well as spaces for the these elements. In this manner, although the beam splitter and laser diode are secured to the substrate in which the photo diodes are formed, size and cost of the optical pick-up head could not be reduced sufficiently.

In the laser unit described in the above mentioned Japanese Patent Application Laid-open Publication Kokai Hei 3-44086, the collimator lens is secured to the housing in such a manner that an outer periphery of the collimator lens is cemented to an inner wall of a circular opening formed in the housing. Therefore, the collimator lens could not be moved in a direction perpendicular to the optical axis of the laser diode, so that an adjustment of a propagating direction of a collimated beam is limited. Further, in this laser unit, a distance between the laser diode and the collimator lens could not be determined accurately, so that an accurately collimated laser beam has to be obtained by changing an oscillation frequency of the laser diode by adjusting an injection current therefor. Therefore, the laser unit could not be applied to an optical pick-up head in which a power of the laser beam is changed between the reading and the recording by adjusting the injection current to the laser diode.

Moreover, the semiconductor laser whose wavelength is varied in accordance with the Injection current could not be manufactured at a large scale at present and is expensive.

SUMMARY OF THE INVENTION

The present invention has for its object to provide a novel and useful optical pick-up head, which can be small in size, light in weight and cheap in coot and can derive an accurate focusing error signal so that a focusing control can be performed precisely.

It is another object of the invention to provide a novel and useful integrated type optical unit for use in an optical pick-up head, which can be small in size, light in weight and cheap in cost, can provide an easy and accurate adjustment and positioning of optical elements, and can endeavor ambient conditions.

It is another object of the invention to provide an integrated type optical unit, in which an adjustment of an collimator lens in a direction of its optical axis can be dispensed with, so that the optical unit can be small in size and cheap in cost.

It is another object of the invention to provide an integrated type optical unit, in which an optical axis of a collimated beam can be performed by means of a collimator lens.

It is another object of the invention to provide an integrated type optical unit which can be small in size and cheap in cost and improve a reliability.

According to the invention, an optical pick-up head for reading and/or recording information from and/or on a magneto-optical record medium comprises:

a semiconductor laser emitting a linearly polarized light flux;

an objective lens projecting said light flux onto a magneto-optical record medium as a fine spot;

a multi-image plane parallel plate arranged between said semiconductor laser and the objective lens in a converged return light flux reflected by said record medium, reflecting the linearly polarized light flux emitted by said semiconductor laser toward said objective lens and transmitting and refracting said return light flux to introduce astigmatism in the return light flux and to perform a polarizing beam splitting, said multi-image plane parallel plate including a first triangular prism and a second triangular prism which are made of birefringent material and are joined with each other; and a signal detecting photodetector receiving a plurality of light fluxes emanating from said multi-image plane parallel plate, detecting an information signal from outputs corresponding to mutually orthogonally polarized light components, and detecting a focusing error signal from outputs corresponding to ordinary and extraordinary light components; wherein said multi-image plane parallel plate is arranged such that directions of major and minor axes of said astigmatism are inclined by 45 degrees with respect to a track direction in which an information track on the magneto-optical record medium extends, an optic axis of said first triangular prism is set such that said return flux is divided into the ordinary light and extraordinary light having substantially identical intensities, a polarizing film is provided on a surface of the first triangular prism upon which said linearly polarized light flux and return light beam are made incident, and an optic axis of said second triangular prism is set to be inclined by a predetermined angle with respect to the optic axis of the first triangular prism.

In a preferable embodiment of the optical pick-up head according to the invention, said semiconductor laser is arranged such that a light spot formed by the objective lens on the magneto-optical record medium becomes an elliptical shape whose major axis is inclined by 45° with respect to the information track, and a half wavelength plate is arranged between the polarizing film and the objective lens such that a polarizing direction of the linearly polarized light flux emitted by the semiconductor laser and impinging upon the record medium becomes in parallel with the information track. Then, an amplitude of a tracking error signal obtained by the push-pull method can be maximized.

In another preferable embodiment of the optical pick-up head according to the invention, said semiconductor laser is arranged such that a light spot formed by the objective lens on the magneto-optical record medium becomes an elliptical shape whose major axis is perpendicular to the information track, and a first half wavelength plate is arranged between the semiconductor laser and the polarizing film and a second half wavelength plate is arranged between the polarizing film and the objective lens such that a polarizing direction of the linearly polarized light flux emitted by the semiconductor laser and impinging upon the record medium become in parallel with the information track. In such an embodiment, a high resolution can be attained and the push-pull signal having a large amplitude can be obtained.

Now it is assumed that an angle between the optic axis of the first triangular prism and the optic axis of the second triangular prism measured about the optical axis of the return beam is β. In a preferable embodiment of the optical pick-up head according to the invention, said angle β is set to $45° \leq \beta(\neq 90°) \leq 135°$, said return beam is divided into a first light beam containing both the ordinary and extraordinary light components of substantially identical intensities, and second and third light beams having polarizing directions which are perpendicular to each other, said signal detecting photodetector comprises a first light receiving unit having four light receiving regions receiving said first light beam containing both the ordinary and extraordinary light components and second and third light receiving units receiving said second and third light beams, respectively. Then, the FES is detected from a difference between a sum of outputs of orthogonally aligned light receiving regions of the first light receiving unit and a sum of outputs of a second set of orthogonally aligned light receiving regions of the first light receiving unit, and the MO signal is obtained from a difference between outputs of said second and third light receiving units. In this embodiment, it is possible to obtain the FES accurately and the MO signal has improved S/N.

In a preferable embodiment of the optical pick-up head according to the invention, said angle β is set to 90°, the return beam is divided into first and second light beams having polarizing directions which are perpendicular to each other emanate from the multi-image plane parallel plate separately from each other, said signal detecting photodetector comprises first and second light receiving units each having four light receiving regions receiving respective one of said orthogonally polarized first and second light beams. Then, the MO signal is obtained from a difference between a sum of the four light receiving regions of the first light receiving unit and a sum of the four light receiving regions of the second light receiving unit and the FES is detected from a sum of a first difference between a sum of outputs of orthogonally aligned light receiving regions of the first light receiving unit and a sum of outputs of a second set of orthogonally aligned light receiving regions of the first light receiving unit, and a second difference between a sum of orthogonally aligned light receiving regions and a sum of orthogonally aligned light receiving regions of the second light receiving unit. Then, the MO signal having a good S/N can be obtained and the FES can be derived accurately although the signal detecting photodetector can be small in size.

As explained above, in the optical pick-up head according to the invention, the linearly polarized laser beam emitted by the semiconductor laser is reflected by the polarizing film applied on the surface of the multi-image plane parallel plate and then is projected onto the magneto-optical record medium as the fine light spot. The return beam reflected by the record medium is made incident upon the multi-image plane parallel plate by means of the objective lens and is separated from the incident light beam. The return beam is subjected to the polarizing beam splitting function as well as the astigmatism such that the directions of the major and minor axes of the astigmatism are set to be inclined by about 45° with respect to the information track of the record medium. The return beams thus divided and being subjected to the astigmatism are received by the photodetector. The MO signal is derived from the outputs of the photodetector corresponding to the mutually orthogonally polarized components and the FES can be obtained from the outputs corresponding to the ordinary and extraordinary light components having substantially identical intensities.

According to the invention, an integrated type optical unit for use in an optical pick-up head for reading and/or recording information from and/or on an optical record medium by projecting a light flux emitted from a semiconductor laser onto an optical record medium and by receiving a return beam reflected by the optical record medium by means of a signal detecting photodetector, wherein said semiconductor laser, signal detecting photodetector and a light path separating element for directing the light beam emitted by the semiconductor laser toward the optical record medium and directing the return beam reflected by the optical record medium toward the photodetector are positioned on a mounting substrate including positioning guides formed by a photolithography.

According to the invention, said substrate is preferably formed by a single crystal silicon wafer, so that the highly precise positioning guides can be formed.

In a preferable embodiment of the optical unit according to the invention, a monitoring photodetector for monitoring an amount of light emitted by said semiconductor laser is provided by positioning with a positioning guide. Then, an output power of the semiconductor laser can be controlled in accordance with an output of the monitoring photodetector.

In a preferable embodiment of the optical unit according to the invention, Raid light path separating element is formed by a multi-image plane parallel plate including first and second triangular prisms made of birefringent materials and joined together, whereby an optic axis of said first triangular prism is set such that said return light flux is divided into ordinary light and extraordinary light having substantially identical intensities, a polarizing film is provided on a surface of the first triangular prism upon which said light flux emitted by the semiconductor laser and return light beam are made incident, and an optic axis of said second triangular prism is set to be inclined by a predetermined angle with respect to the optic axis of the first triangular prism. In this embodiment, it is possible to obtain the MO signal having high S/N and the FES in a precise manner.

In a preferable embodiment of the optical unit according to the invention, said mounting substrate comprises an upper substrate and a lower substrate each being made of silicon single crystal, recesses are formed In the lower substrate by anisotropic etching and corresponding openings are formed in the upper substrate by anisotropic etching, said upper and lower substrates being joined together to constitute the positioning guides by said recesses and openings. In this embodiment, the recess and opening can define positioning surfaces for different directions, so that a desired element can be easily and positively arranged in position.

According to the invention, an integrated type optical unit for use in an optical pick-up head for reading and/or recording information from and/or on an optical record medium comprises: a mounting substrate including a silicon wafer having a (110) uppermost surface and having formed therein upright recesses or upright walls each formed by (111) surfaces;

a semiconductor laser secured to one or more upright recesses or upright walls, positioned at least in a direction of an optical axis of the semiconductor laser and emitting a light beam;

a photodetector secured to one or more upright recesses or upright walls, positioned at least in a direction of an optical axis or the photodetector and receiving a return beam reflected by an optical record medium; and an optical path separating element secured to one or more upright recesses or upright walls, positioned at least in a direction of an optical axis thereof, directing the light beam emitted by the semiconductor laser toward the optical record medium and directing the return beam toward the photodetector.

According to the invention, an integrated type optical unit for use in an optical pick-up head for reading and/or recording information from and/or on an optical record medium comprises:

a mounting substrate including a silicon wafer having a (100) uppermost surface and having formed therein a plurality of pyramid recesses with {111} side walls;

a semiconductor laser secured to A pyramid recess of the mounting substrate, positioned at least in a direction of an optical axis of the semiconductor laser and emitting a light beam;

a photodetector secured to a pyramid recess, positioned at least in a direction of an optical axis of the photodetector and receiving a return beam reflected by an optical record medium; and an optical path separating element secured to a pyramid recess, positioned at least in a direction of an optical axis thereof, directing the light beam emitted by the semiconductor laser toward the optical record medium and directing the return beam toward the photodetector.

According to the invention, an integrated type optical unit for use in an optical pick-up head for reading and/or recording information from and/or on an optical record medium comprises:

a mounting substrate including an uppermost polyimide film having a plurality of upright recesses;

a semiconductor laser secured to one of said upright recesses of the mounting substrate, positioned at least in a direction of an optical axis of the semiconductor laser and emitting a light beam;

a photodetector secured to another one of said upright recesses of the mounting substrate, positioned at least in a direction of an optical axis of the photodetector and receiving a return beam reflected by the optical record medium; and an optical path separating element secured to another one of said upright recesses of the mounting substrate, positioned at least in a direction of an optical axis of the optical path separating element, directing the light beam emitted by the semiconductor laser toward the optical record medium and directing the return beam reflected by the optical record medium toward the photodetector.

According to further aspect of the invention, an integrated type optical unit for use in an optical pick-up head for reading and/or recording information from and/or on an optical record medium comprises:

a mounting substrate including a silicon wafer having a (110) uppermost surface and having formed therein a plurality of upright walls formed by {111} surfaces;

a semiconductor laser secured to one or more (111) upright walls and emitting a light beam;

a photodetector secured to one or more (111) upright walls different from said one or more upright walls to which said semiconductor laser is secured, and receiving a return beam reflected by the optical record medium; and an optical path separating element secured to at least two convex corners of upright walls different from the upright walls to which said semiconductor laser and photodetector are secured, a rotation of said optical path separating element being inhibited by said at least two upright walls, directing the light beam emitted by the semiconductor laser toward the optical record medium and directing the return beam reflected by the optical record medium toward the photodetector.

In a preferable embodiment of the optical unit according to the invention just mentioned above, the upright walls to which the semiconductor laser is secured and the upright walls to which the photodetector is secured are formed by (111) surfaces having the same orientation. In such an embodiment, desired distances between the semiconductor laser, photodetector and optical path separating element can be attained with a precision of micron order.

In order to adjust the positioning for the semiconductor laser and photodetector easily and accurately, it in preferable to form air conduit holes in the mounting substrate. In this case, the semiconductor laser and photodetector can be urged against the upright walls by sucking an air through the air conduit holes, In the optical unit according to the invention, said upright walls can be formed in the mounting substrate with an extremely high precision by using light reducing method and anisotropic etching which have been highly developed in a semiconductor manufacturing field. Therefore, the optical elements can be positioned accurately with a precision of micron order. Moreover, the optical unit can be small in size, light in weight and thin in thickness, and further the optical unit can be used under sever conditions.

According to further aspect of the invention, an optical pick-up head for reading and/or recording information from and/or on an optical record medium, in which a laser beam emitted by a laser diode is reflected by a beam splitter and then is made incident upon an optical record medium by means of a collimator lens and an objective lens as a fine spot, a return laser beam reflected by the optical record medium is-made incident upon the beam splitter via the objective lens and collimator lens, and the return laser beam transmitted through and refracted by the beam splitter is made incident upon a photodetector, wherein the improvement comprises a block including a mounting substrate on which the laser diode, beam splitter and photodetector are mounted, a base member on which said block and collimator lens are mounted, a reference surface formed in said block perpendicular to an optical axis of a light flux emanating from said mounting substrate, an abutment surface formed in said base member, against which said reference surface is urged, and a fixing surface amounting said collimator lens, said securing surface being parallel with said abutment surface.

In this optical pick-up head, the abutment surface formed in the base member and the collimator lens securing surface are made in parallel with each other, so that a distance between these surfaces can be precisely determined by machine working and thus the adjustment of the collimator lens in a direction of its optical axis can be dispensed with.

According to further aspect of the invention, an optical pick-up head for reading and/or recording information from and/or on an optical record medium, in which a laser beam emitted by a laser diode is reflected by a beam splitter and then in made incident upon an optical record medium by means of a collimator lens and an objective lens as a fine spot, a return laser beam reflected by the optical record medium is made incident upon the beam splitter via the objective lens and collimator lens, and the return laser beat transmitted through and refracted by the beam splitter is made incident upon a photodetector, wherein the improvement comprises a block including A mounting substrate on which the laser diode, beam splitter and photodetector are mounted, a base member on which said block and collimator lens are mounted, and a flat mounting surface formed in said base member for mounting said collimator lens, whereby said collimator lens has a flat surface which is parallel with said flat mounting surface and the collimator lens is mounted on the base member such that said flat surface is urged against said flat mounting surface of the base member.

In this optical pick-up head, the collimator lens is mounted on the flat securing surface formed in the base member, and therefore the collimator lens can be adjusted in a plane perpendicular to its optical axis.

In a preferable embodiment of the optical pick-up head according to the invention, said block is closed by means of the collimator lens, base member and cover member. In this case, the optical elements arranged within the closed space of the block can be effectively prevented from being degraded by moisture, dust and electrical influence, so that it is possible to realize an optical pick-up head having a high reliability.

BRIEF DESCRIPTION OF THE DRAWINGS

FIG. 1 is a schematic view showing a known optical pick-up head;

FIG. 2 is a schematic view illustrating a photodetector shown in FIG. 1;

FIG. 13 is a perspective cross sectional view explaining an etching process forming a mounting substrate shown in FIG. 12;

FIGS. 14A, 14B and 14C are schematic views illustrating a third embodiment of the optical pick-up head according to the invention;

FIG. 15 is a schematic view depicting a basic optical construction of a fourth embodiment of the optical pick-up head according to the invention;

FIG. 17 is a schematic plan view of a photodetector shown in FIG. 16;

FIGS. 18A and 18B are side and plan views, respectively illustrating an optical unit of a fifth embodiment of the optical pick-up head according to the invention;

FIGS. 19A, 19B, 20A, 20B and 21A, 21B are schematic view explaining the anisotropic etching forming a mounting substrate;

FIG. 22 is a schematic view representing an optical unit of a sixth embodiment of the optical pick-up head according to the invention;

FIGS. 23A, 23B and 23C are schematic views illustrating mounting recesses;

FIGS. 24A, 24B and 24C are schematic views showing an optical unit of a seventh embodiment of the optical pick-up head according to the invention;

FIGS. 26A, 26B and 26C are schematic views explaining another method of mounting the beam splitting element;

FIGS. 28A, 28B, 28C, 28D, 28E and 28F are schematic views showing a mounting substrate of an eighth embodiment of the optical pick-up head according to the invention;

FIGS. 29A, 29B and 29C are schematic views showing a mounting substrate of a ninth embodiment of the optical pick-up head according to the invention;

FIG. 30 is a schematic view depicting an optical unit of a tenth embodiment of the optical pickup head according to the invention;

FIG. 31 is a schematic view illustrating a part of an optical unit of an eleventh embodiment of the optical pick-up head according to the invention;

FIG. 32 is a cross sectional view showing an air suction holes;

FIGS. 33A, 33B and 34A, 34B are schematic views explaining the anisotropic etching;

FIGS. 36A and 36B are schematic views illustrating a twelfth embodiment of the optical pick-up head according to the invention;

FIGS. 39A and 39B are schematic views illustrating an optical unit of the thirteenth embodiment; and FIGS. 40A and 40B are schematic views showing an optical unit of a fourteenth embodiment of the optical pick-up head according to the invention.

DESCRIPTION OF THE PREFERRED EMBODIMENTS

Figure 3:
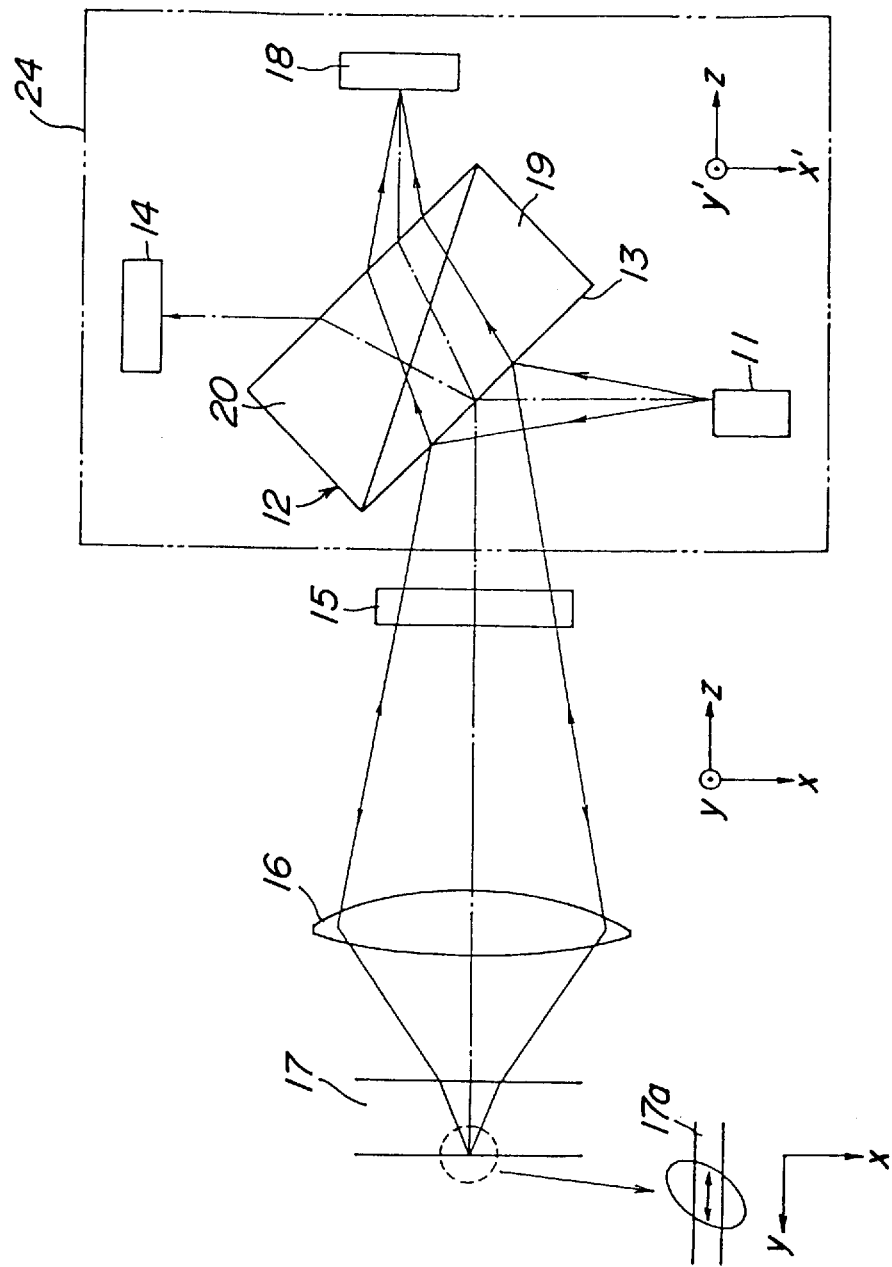
FIG. 3 is a schematic view depicting a first embodiment of the optical pick-up head according to the invention.

FIG. 3 is a schematic view illustrating a first embodiment of the optical pick-up head according to the invention. In the present embodiment, a linearly polarized diverging light beam emitted by a semiconductor laser 11 is made incident upon a multi-image plane parallel plate 12 having a polarizing film 13 applied on an incident surface. A light flux transmitted through the polarizing film 13 and multi-image plane parallel plate 12 is received a monitor photodetector 14 and an output power of the semiconductor laser 11 is controlled in accordance with an output of the monitor photodetector 14.

A light beam reflected by the polarizing film 13 is made incident upon a 45° rotator 15 so that a polarizing direction of the linearly polarized light beam is rotated by 45°. The light beam emanating from the rotator 15 is projected by an objective lens 16 upon a magneto-optical record medium 17 as a very fine spot. A return light beam reflected by the magneto-optical record medium 17 is converged by the objective lens 16 and is made incident upon the polarizing film 13 via the 45° rotator 15. Then, the return light beam is separated from the incident light beam by the polarizing film 13 and is transmitted and refracted by the multi-image plane parallel plate 12, so that astigmatism is introduced into the return beam and the return beam is divided into a plurality of light beams by the polarizing beam splitting function. The thus divided light beams are received by a photodetector 18 to derive MO signal, FES and TES.

The semiconductor laser 11 is arranged in such an orientation that a direction of the polarization of the linearly polarized laser beam emitted by the semiconductor laser is not such that the laser beam in made incident upon the polarizing film 13 as S-polarized beam. The multi-image plane parallel plate 12 is arranged such that a major axis and a minor axis of the astigmatism introduced by the plate 12 into the return light beam are inclined by 45° with respect to an information track 17a on the magneto-optical record medium 17. The plane parallel plate 12 is formed by first and second triangular prisms 19 and 20 made of lithium niobate, said first and second prisms being joined with each other. The polarizing film 13 is applied on an incident surface of the first prism 19, upon which the diverging light beam emitted by the semiconductor laser 11 as well as the return light beam reflected by the magneto-optical record medium 17 are made incident. The polarizing film 13 is formed by multi-coatings of dielectric films such that S-polarized light vibrating perpendicularly to a plane of the drawing of FIG. 3 is reflected by 60–90% but P-polarized light vibrating in the plane of the drawing of FIG. 3 is transmitted by 100%.

The light beam emitted by the semiconductor laser 11 has an elliptical cross section, so that if there is not adopted any beam shaping, a light spot formed on the magneto-optical record medium 17 becomes also elliptical. Since the multi-image plane parallel plate 12 is inclined by 45° in the plane perpendicular to the plane of the drawing, and thus major and minor axes of the elliptical spot are inclined by 45° with respect to a track direction in which the information track 17a extends. Therefore, the polarizing direction might be inclined by 45° with respect to the information track 17a. In the present embodiment, the polarizing direction of the incident light beam is rotated by 45° by means of the rotator 15, so that the polarizing direction of the incident light beam is parallel with the track direction, In this manner, it is possible to attain the push-pull (PP) signal having a maximum amplitude.

The 45° rotator 15 is made of quartz out in a z-x or z-y plane and is polished to have such a thickness that ordinary light and extraordinary light have a relative phase difference of 180°. Such a rotator is also called a quarter wavelength plate. The 45° rotator 15 may be made of quartz cut in z axis cross section and is polished to have such a thickness that right-handed circularly polarized beam and left-handed circularly polarized beam have a phase difference of 90°. The latter rotator is not depends on the polarizing direction of the linearly polarized beam.

Figure 4:
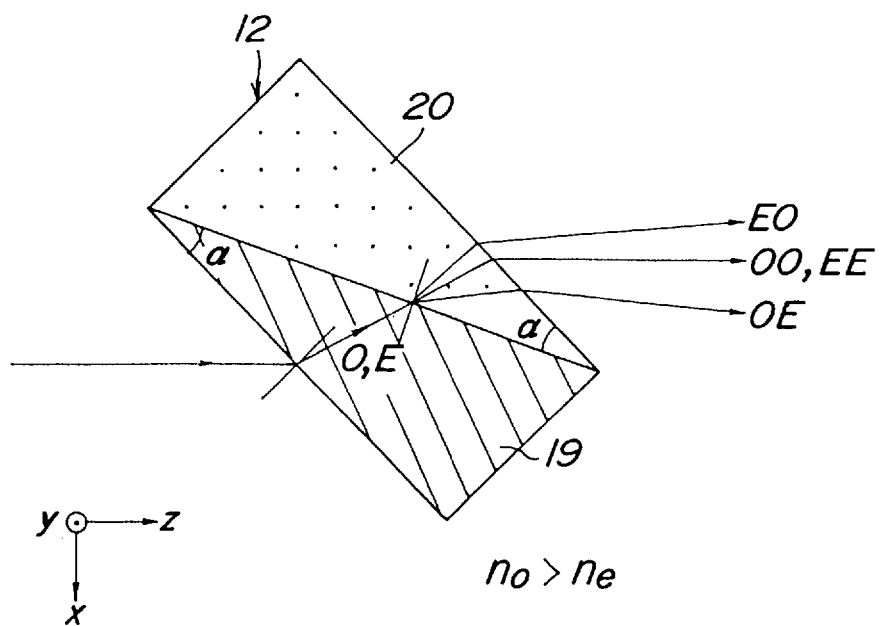
FIG. 4 is a schematic view of a multi-image plate shown in FIG. 3.

FIG. 4 is a schematic view showing the multi-image plane parallel plate 12 of the present embodiment. The first and second triangular prisms 19 and 20 have an apex angle α smaller than 45°. In order to divide the return beam into ordinary and extraordinary light beams having substantially equal intensities, an optic axis of the first prism 19 is set to be perpendicular to an optical axis of the return beam and is inclined by 45° with respect to the plane perpendicular to a plane of the drawing of FIG. 4. An optic axis of the second prism 20 is rotated by β with respect to the optic axis of the first prism 19 viewed in the plane perpendicular to the optical axis. In the present embodiment, β is set to 45°.

Figure 5:
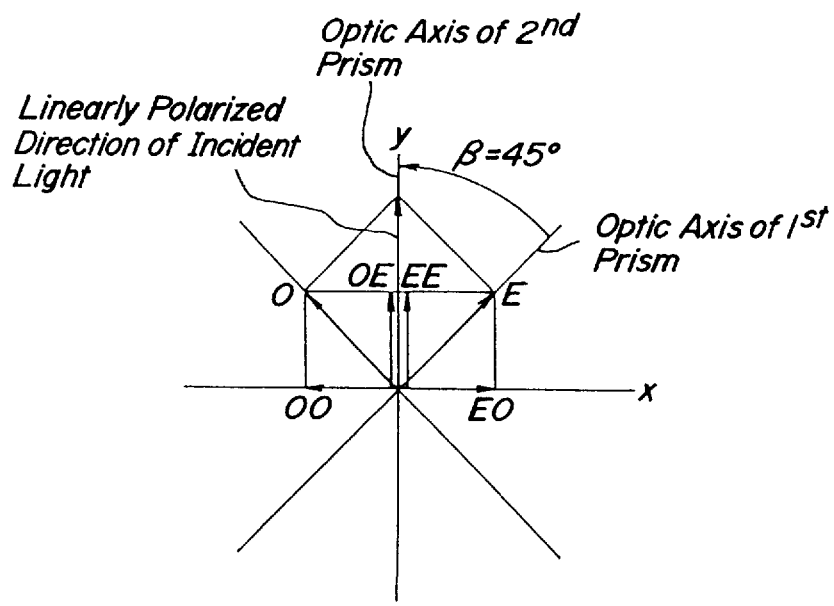
FIG. 5 is a diagram explaining the function of the multi-image plate.

By setting the optic axes of the first and second prisms 19 and 20 in the manner explained above, the return beam is first divided by the first prism 19 into ordinary light O and extraordinary light E having substantially identical intensities as depicted in FIG. 5. Then, the ordinary light O is divided by the second prism 20 into ordinary light OO and extraordinary light OE and similarly the extraordinary light E is divided by the second prism 20 into ordinary light EO and extraordinary light EE. In this manner, the return beam impinging upon the multi-image plane parallel plate 12 is divided into the four beams OO, OE, EO and EE by the polarizing beam splitting function. In this case, propagating directions of the ordinary light OO and extraordinary light EE are substantially coincided with each other, so that there are emanated three light beams from the multi-image plane parallel plate 12.

Figure 6:
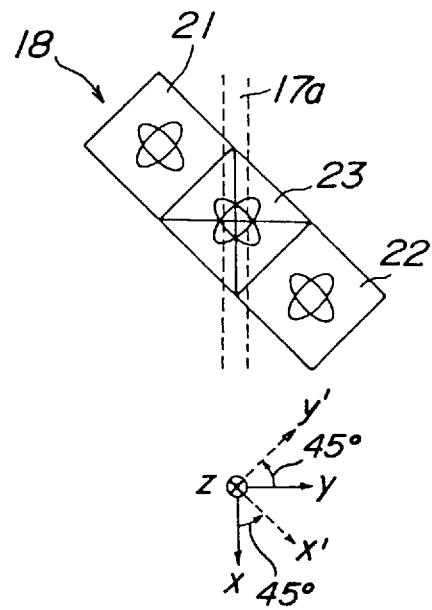
FIG. 6 is a schematic view of a photodetector shown in FIG. 3.

In FIG. 3, the signal detection photodetector 18 is arranged such that its light receiving plane situates at a best image plane of the astigmatism introduced by the plane parallel plate 12. FIG. 6 is a plan view of this photodetector 18. The photodetector 18 comprises a first light receiving unit 21 receiving the light beam EO, a second light receiving unit 22 receiving the light beam OE and a third light receiving unit 23 including four light receiving regions receiving the light beams OO and BE.

Then, the light receiving units 21 and 22 receive the light beams polarized in mutually orthogonal directions, and thus the MO signal can be derived by a difference between outputs of these light receiving units 21 and 22, Further, the FES can be obtained by deriving a difference between a first sum of outputs of a first pair of orthogonally aligned light receiving regions and a second sum of outputs of outputs of a second pair of orthogonally aligned light receiving elements of the light receiving unit 23. In FIG. 3, an optical unit 24 encircled by a dot and dash line is shown on the same plane on which the remaining optical elements are shown, but in practice the optical unit 24 is inclined by 45° about the z axis. That is, x' and y' axes shown in FIG. 3 are inclined by 45° with respect to the x and y axes. Therefore, the image of the information track 17a on the light receiving unit 23 extends in the x axis along which the light receiving regions are divided. Then, the TES can be obtained by deriving a difference between a third sum of outputs of a third pair of light receiving regions arranged on one side of the x axis and a fourth sum of outputs of a fourth pair of light receiving regions arranged on the other side of the x axis by the PP method.

In the present embodiment, Since the image of the information track 17a on the light receiving unit 23 is aligned with the x axis along which the light receiving regions are divided, it is possible to prevent influence of the PP signal upon the FES, and at the same time the two light beams polarized in the mutually orthogonal directions and having substantially equal intensities are made incident upon this light receiving unit 23, influence due to a birefringency of a substrate of the magneto-optical record medium 17, and thus it is possible to detect the FES with high precision and sensitivity.

Moreover, the multi-image plane parallel plate 12 is made of lithium niobate having a birefringency, and thus a distance between the multi-image plane parallel plate 12 and the signal detection photodetector 18 can be 1–2 mm without providing a concave lens, so that the return bean can be positively divided by the polarizing beam splitting function. Therefore, the optical pick-up head according to the invention can be small in size and thin in thickness, When the quartz is used as the birefringent crystal, since a difference in a ratio between an index of refraction $n_o$ for ordinary light and an index of refraction $n_e$ for extraordinary light is about 0.6%, it is impossible to attain a sufficiently long optical path length necessary for separating the light beams from each other. However, when use is made of lithium niobate having $n_o$=2.286 and $n_e$=2.2, a difference in a ratio between $n_o$ and $n_e$ is about 4%. Therefore, the light beams can be positively separated from each other even If a distance between the multi-image plane parallel place 12 and the photodetector 18 is short such as 1–2 mm.

In the first embodiment, a finite optical system is adopted, but according to the invention an infinite optical system can be also adopted. In this case, a collimator lens is arranged between the multi-image plane parallel plate 12 and the objective lens 16 so that the multi-image plane parallel plate is located in a converging optical path of the return beam. In the present embodiment, the polarizing film 13 is directly applied on the incident surface of the first triangular prism 19, but according to the invention, a plane parallel glass plate may be arranged in front of the incident surface of the first prism and the polarizing film may be applied on this plane parallel glass plate. In this case, the polarizing film 13 may be easily designed.

According to the invention, the optic axes of the first and second triangular prisms 19 and 20 constituting the multi-image plane parallel plate 12 may be set at will in accordance with birefringent materials to be used. In the above mentioned first embodiment, the optic axes of the first and second triangular prisms 19 and 20 are set to form an angle β=45° viewed about the optical axis in the plane perpendicular to the optical axis of the return beam, and therefore the a ratio of intensities of the light beams EO, OE and (OO+EE) becomes 1:1:2. According to the invention, said angle β may be set to 45°<β(≠90)<135°. Then, OO=EE<OE=EO and an amount of a light beam impinging upon the light receiving units 21 and 22 is increased so that S/N of the MO signal can be improved.

The multi-image plane parallel plate 12 may be made of birefringent materials other than lithium niobate. For instance, KDP and ADP may be utilized. KDP has $n_o$=1.51 and $n_e$=1.47 and ADP has $n_o$=1.52 and $n_e$=1.48, so that a difference in ratio of $n_o$ and $n_e$ of these materials is equal to or more than 2%. Therefore, these birefringent materials can be advantageously utilized to form the multi-image plane parallel plate 12, and the light beams emanating from the multi-image plane parallel plate can be positively separated from each other without provided a concave lens between the multi-image plane parallel plate 12 and the photodetector 18 and a distance between these elements can be made short such as 1–2 mm. Therefore, the optical pick-up head can be made small in size and thin in thickness.

Figure 7:
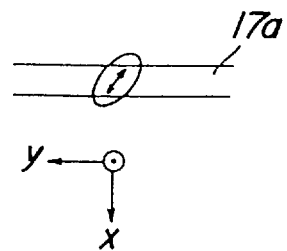
FIG. 7 is a schematic view illustrating a first modification of the embodiment shown in FIG. 3.

In a first modification of the first embodiment of the optical pick-up head according to the invention, the 45° rotator 15 in the first embodiment is dispensed with and the linearly polarizing direction and the major and minor axes of the elliptical laser beam spot formed on the magneto-optical record medium are inclined by 45° with respect to the information track 17a as illustrated in FIG. 7. In this modification, an amplitude of the PP signal is slightly decreased, but the number of parts can be reduced, so that the optical pick-up head can be small in size, light in weight and cheap in cost.

Figure 8:
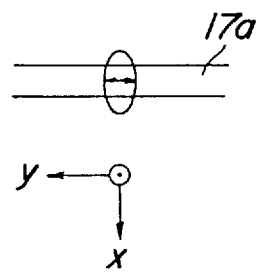
FIG. 8 is a schematic view depicting a second modification of the embodiment of FIG. 3.

In a second modification of the optical pick-up head according to the invention, the semiconductor laser 11 is rotated by 45° about the optical axis, a 45° rotator is arranged between the semiconductor laser 11 and the multi-image plane parallel plate 12 such that the linearly polarized laser beam emitted by the semiconductor laser 11 is made incident upon the polarizing film 13 as S-polarized beam, and a light spot is formed on the magneto-optical record medium 17 such that the polarizing direction and the minor axis of the elliptical beam are in parallel with the information track 17a as depicted in FIG. 8.

In this second modification, it is possible to attain similar advantages to those of the first embodiment and further a resolution can be increased, because a size of the beam spot in the track direction can be reduced. Moreover, the 45° rotator arranged between the semiconductor laser 11 and the multi-image plane parallel plate 12 can be identical with the 45° rotator 15 arranged between the multi-image plane parallel plate 12 and the objective lens 16, so that rotators of a single kind can be commonly used as both the rotators.

Figure 9:
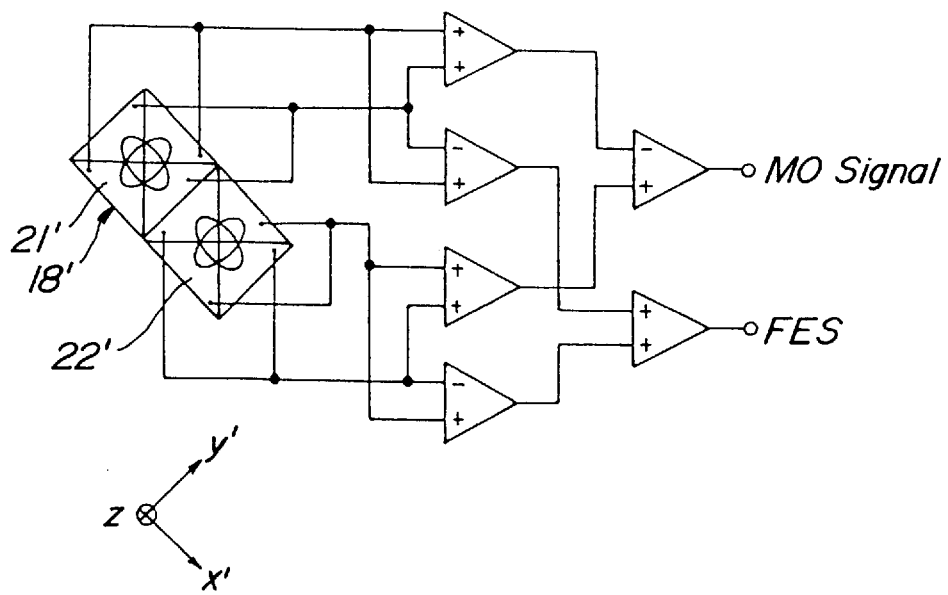
FIG. 9 is a schematic view showing a third modification of the embodiment illustrated in FIG. 3.
Figure 10:
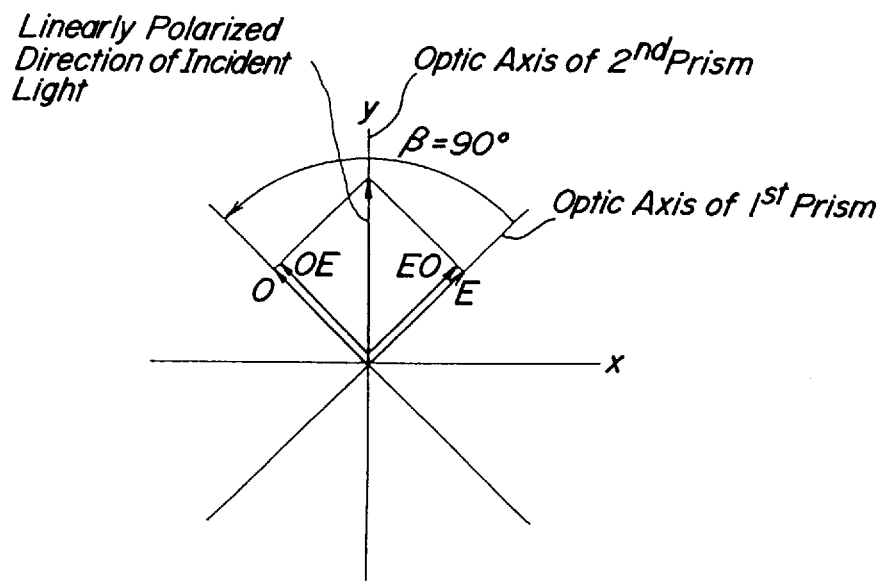
FIG. 10 is a diagram representing a function of a multi-image plate of the embodiment shown in FIG. 9.

FIG. 9 shows a photodetector of a third modification of the first embodiment. In this third modification, the angle β between the optic axes of the first and second triangular prisms 19 and 20 about the optical axis is set to 90°, and a signal detecting photodetector 18' comprises two light receiving units 21' and 22' each including four light receiving regions. When β=90°, the multi-image plane parallel plate 12 becomes a Wollaston's prism and an intensity of light beams (OO+EE) becomes zero, so that only two light beams OE and EO emanate from the multi-image plane parallel plate 12, said light beams being polarized in mutually orthogonal directions.

In the third modification, the light beam EO is received by the light receiving unit 21' and the light beam OE is received by the light receiving unit 22'. Then, the MO signal can be derived as a difference between a first sum of outputs of the light receiving unit 21' and a second sum of outputs of the light receiving unit 22', and the FES can be obtained by a sum of a first difference between outputs of a first pair of light receiving regions aligned diagonally and outputs of a second pair of light receiving regions aligned diagonally of the light receiving unit 21' and a second difference between outputs of a first pair of light receiving regions aligned diagonally and outputs of a second pair of light receiving regions aligned diagonally of the light receiving unit 22'. It should be noted that the TES may be detected by the PP method like as the first embodiment.

In a fourth modification of the first embodiment of the optical pick-up head according to the invention, a grating is arranged between the semiconductor laser 11 and the multi-image plane parallel plate 12 and the light beam emitted by the semiconductor laser 11 is divided into a main beam and two sub-beams, and these three beams are made incident upon the magneto-optical record medium 17 such that they have a predetermined relationship with respect to the information track 17a. There are provided light receiving units receiving return beams of the two sub-beams, while a return beam of the main beam is received in a similar manner to that of the first embodiment to derive the MO signal and FES. Then, the FES is detected by the three-beam method by receiving the two sub-return beams by the added light receiving units.

Now several embodiments of the integrated type optical unit for use in the optical pick-up head according to the invention will be explained.

The optical pick-up head according to the invention may be realized as the infinite optical system or finite optical system. In an actual example of the infinite optical system without the beam shaping function, the collimator lens or in an actual example of the finite optical system without the beam shaping function, NA of the objective lens on a side of the semiconductor laser 11 is 0.15 and NA on a side of the record medium 17 is 0.55, so that a magnification is about 3.7. With the beam shaping function, NA of the collimator lens becomes smaller than the above mentioned values, so that the magnification is further increased.

In such an optical system, when a focal depth at the record medium has to be set to ±1 $\mu$m, a movement of the image on the signal detecting photodetector in the direction of the optical axis becomes ±$\mu$m×2×3.7$^2$=±27 $\mu$m. It is practically impossible to adjust the photodetector in the x, y and z axes within said value. Therefore, in the known optical pick-up head, a concave lens is provided to increase a magnification and a positioning precision in enlarged, so that the adjustment of the photodetector in the direction of the optical axis is performed. However, it is undesired to provide the concave lens in order to make the optical head small in size and thin in thickness.

Moreover, if the adjustment of the signal detecting photodetector in carried out only in two axes in a plane, it is required to adjust the photodetector in the optical axis with respect to an imaginary conjugate point of a light emitting point of the semiconductor laser. Furthermore, in this case, it is impossible to absorb other errors in the direction of the optical axis by the adjustment, so that the following errors have to be not larger than ±10 $\mu$m by considering a fluctuation in a normal distributions (1) error in positioning the semiconductor laser in the direction of the optical axis; (2) error in a thickness of the multi-image plane parallel plate; (3) error in positioning the multi-image plane parallel plate; (4) error in positioning the signal detecting photodetector; and (5) other errors.

Figure 11:
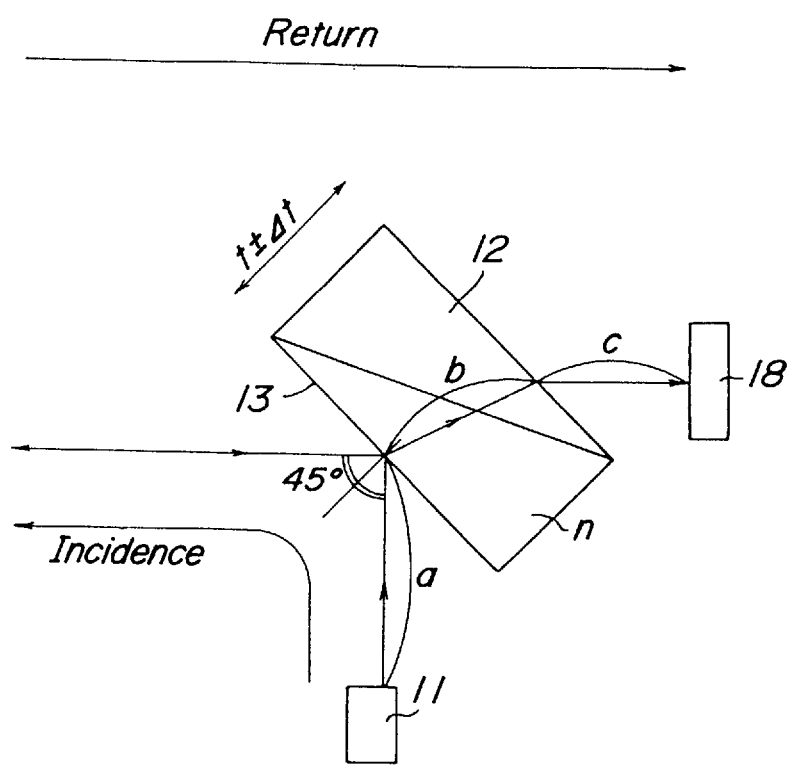
FIG. 11 is a schematic view illustrating a positional relationship of optical elements in the first embodiment shown in FIG. 3.

FIG. 11 is a schematic view illustrating a positional relationship of the semiconductor laser 11, signal detecting photodetector 18 and multi-image plane parallel plate 12 for separating the incident light beam and return light beam from each other, Now it is assumed that a distance from the semiconductor laser 11 to the polarizing film 13 is a, a distance from the polarizing film 13 to the signal detecting photodetector 18 via the multi-image plane parallel plate 12 is b+c and an index of refraction of the multi-image plane parallel plate 12 is n. Then, an optical conjugate positional relationship of the semiconductor laser 11, multi-image plane parallel plate 12 and photodetector 18 becomes a=b(2−1/n)+c.

In order to realize a practically usable small and thin optical pick-up head, a=2 mm, n=2.2 and a thickness t of the multi-plane parallel plate 12 has to be 2 mm. Then, the distance a from the light emanating point of the multi-image plane parallel plate 12 to the photodetector 18 becomes about 1.5 mm. Therefore, it is practically difficult to mount the optical elements onto a housing which is machined usually while the above mentioned errors (1), (3) and (4) are restricted within given ranges. Moreover, the adjustment in the three axes within such a small space might cause an increase in the number of adjusting steps. When a thickness t of the multi-image plane parallel plate 12 has an error of Δt, the conjugate position b(2−1/n)+c deviates by about b·Δt/t. Therefore, the above condition (2) can be substantially satisfied if Δt is limited smaller than ±10 $\mu$m. A thickness t of the multi-image plane parallel plate 12 may be adjusted into a desired value by sliding the first and second triangular prisms relative to each other along their contact surfaces upon joining the prisms.

Figure 12:
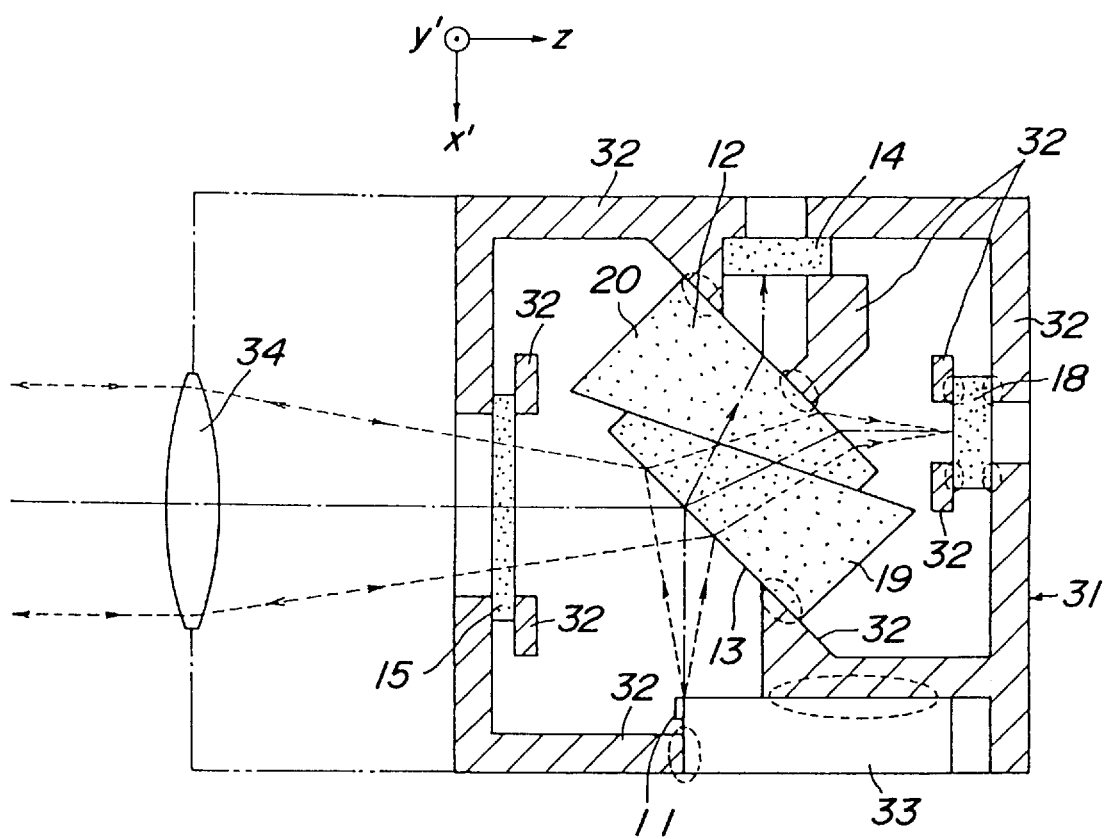
FIG. 12 is a cross sectional view showing a second embodiment of the optical pick-up head according to the invention.

FIG. 12 is a schematic view showing a second embodiment of the optical pick-up head according to the invention. In the present embodiment, portions similar to those of the first embodiment are denoted by the same reference numerals used in FIG. 3. In this embodiment, in order to satisfy the above mentioned conditions (1) positioning precision of the semiconductor laser, (3) positioning precision of the multi-image plane parallel plate and (4) positioning precision of the signal detecting photodetector, a substrate 31 of a housing has positioning guides 32 in a form of recess or projection. Such a substrate 31 is formed by a photolithography method, in which as a preparatory process, a photo-mechanical process by a light reduction method is carried out and in a post process, material removal is carried out by etching and material addition is performed by electroplating, The semiconductor laser 11, multi-image plane parallel plate 12, signal detecting photodetector 18, monitoring photodetector 14 and 45° rotator 15 are mounted on the substrate 31 while they are placed in position by using the positioning guides 32.

The semiconductor laser 11 is secured to a heat radiating stem 33 such that a light emitting point becomes coincided with an end face, and the stem 33 is mounted on the substrate 31 such that positioning of the semiconductor laser 11 in the direction of the optical axis and one direction of two orthogonal directions on a plane perpendicular to the optical axis are defined by the positioning guides 32, so that upon mounting the stem 33 on the substrate 31, it is necessary to perform the adjustment only in the other direction of the two orthogonal directions. The signal detecting photodetector 18, monitoring photodetector 14 and 45° rotator 15 are positioned by the positioning guides 32 only in directions of respective optical axes, so that the adjustment has to be carried out in two orthogonal directions on respective planes perpendicular to the optical axes. The incident surface of the first triangular prism 19 of the multi-image plane parallel plate 12 on which the polarizing film 13 is applied as well as the exit surface of the second triangular prism 20 from which the light beams emanate are positioned by the positioning guides 32 and the two dimensional adjustment on these planes of the first and second prisms 19 and 20 is carried out. The function of the optical elements is entirely same an that of the first embodiment, so that it is not explained here.

Since the positioning guides 32 of the substrate 31 are formed by the photolithography method, and thus the machining precision can be improved as compared with usually machining, and thus the optical elements can be mounted on the substrate 31 easily and precisely. In the present embodiment, all the optical elements including the objective lens 16 as illustrated in a chain line can be mounted on the single square substrate 31 having a side of 7 mm.

In the present embodiment, optical elements are inserted along the positioning guides, and therefore particularly semiconductor laser 11, multi-image plane parallel plate 12 and signal detecting photodetector 18 are subjected to so-called Abbe's error of θ·h as the above mentioned other error (5), wherein h is a distance from a substrate bottom to an optical axes of an element and θ is an inclination angle with respect to the optical axis. When this error has to be kept not larger than ±10 μm under a condition of h=1 mm, it is sufficient to restrict θ not larger than ±5°. This condition can be relatively easily satisfied.

Upon adjusting a position of the signal detecting photodetector 18 in the two orthogonal directions on the plane perpendicular to the optical axis, i.e. x' and y' directions in FIG. 12, it is preferable to utilize an optical device which can return a parallel light beam emanating from the optical unit to the optical unit at it is, while a collimator lens 34 is secured to the optical unit. When the infinite optical system is considered, such an optical device can be realized by corner cube prism or cat's eye lens including a lens and a mirror arranged at a focal point of the lens. In this case, when the collimator lens 34 is secured to the optical unit as shown by a chain line in FIG. 12, the post process can be made easy.

In the present embodiment, the optical elements are mounted on the substrate 31 of the housing by utilizing the positioning guides 32 formed by the photolithography, and therefore machining precision for the substrate 31 becomes most important. The substrate 31 may be manufactured by an isotropic machining including under or side etching and an anisotropic machining without side etching.

In case of the isotropic machining, in order to attain a required precision, it is preferable to design a photomechanical size by considering an etching margin due to the under cut and an electroplating margin. At the same time, it is preferable to use a standard pattern for monitoring a finished size of a work piece during the machining process.

In the anisotropic process, it is preferable to utilize a dependency of an etching speed of a substrate material such as a single crystal silicon for a solution of an enchant such as KOH (potassium hydroxide) upon an orientation of the crystal. In this case, an etching rate of a crystal plane (111) of a silicon single crystal is extremely smaller than those of other planes, and a maximum etching rate is obtained for a crystal plane (110). A ratio of these etching rates amounts to 1:180. By utilizing ouch a property, it is possible to form a deep recess 43 in a surface of a silicon wafer 41 as shown in FIG. 13, by performing an isotropic etching by providing a mask having an aperture extending in <1$\overline{1}$2> or <$\overline{1}$12> direction on a (110) surface of the silicon wafer 41. In this manner, it is possible to form a deep recess 43 having {111} upright side walls 42.

In the manner explained above, by etching the (110) silicon waver 41 such that {111} surfaces become the upright side wall 42 and {111} surfaces become bottoms, it is possible to obtain a recess having a high aspect ratio and a depth of 500 μm while an error in a width can be restricted not larger than 3 μm. The anisotropic etching of silicon single crystal has been explained in detail in Japanese Publication, Sato, "Anisotropic Etching Technique for Single Crystal Silicon", Precision Machinery Engineering Society, Vol. 53, No. 6, 1987, pp. 849–852.

In the optical unit encircled by a chain line in FIG. 12, a micron order precision is required. In general, the fine adjustments in three directions in the x'z plane, i.e. the x' and z directions and a direction inclined by 45° with respect to these axes are required. This can be satisfied by using the substrate formed by the anisotropic etching.

FIGS. 14A to 14C are schematic views showing a third embodiment of the optical pick-up head according to the invention. In the present embodiment, a substrate unit 51 is formed by joining lower substrate 52 and upper substrate 53. The lower substrate 52 is formed by a silicon single crystal wafer having a crystal plane denoted in FIG. 14A and having a thickness of about 1 mm. In this lower substrate 52 there are formed recesses having a depth of about 500 μm for accommodating and positioning optical elements. In the present embodiment, the optical system is same as that of the second embodiment shown in FIG. 12, Therefore, the lower substrate 52 has formed therein a recess 54 for the semiconductor laser 11, a recess 55 for the multi-image plane parallel plate 12, a recess 56 for the signal detecting photodetector 18 and a recess 57 for the monitoring photodetector 14. Therefore, the recesses 54, 56 and 57 have required precision in the <$\overline{1}$11> direction. It should be noted that the recess 55 has a size slightly larger than the multi-image plane parallel plate 12.

The upper substrate 53 shown in FIG. 14B in formed by a single crystal silicon wafer having a thickness of about 0.1–0.3 mm. In the upper substrate 53 there are formed, by the anisotropic etching, a cut-out portion and through holes for positioning and mounting the above mentioned optical elements. That is, a out-out portion 58 for the semiconductor laser 11, a hole 59 for the multi-image plane parallel plate 12, a hole 60 for the signal detecting photodetector 18 and a hole 61 for the monitoring photodetector 61. Therefore, the hole 59 for positioning and mounting the multi-image plane parallel plate 12 has a required precision in the <$\overline{1}$11> direction. It should be noted that the cut-out portion 58 and holes 60 and 61 are formed to be slightly larger than the corresponding optical elements 11, 18 and 14.

The lower and upper substrates 52 and 53 are relatively positioned by utilizing previously formed positioning marks, and then are jointed together by direct contact or anodic junction. After that, an assembly is cut to form the substrate unit 51 shown in FIG. 14C. In the present embodiment, it is possible to perform the positioning in two directions. If one more substrate is added, it is possible to perform the positioning in three directions. In the present embodiment, the output power of the semiconductor laser 11 is monitored by receiving the laser beam reflected by the polarizing film 13.

In a modification of the third embodiment, use is made of a substrate having formed therein positioning guides which can perform the positioning in three directions with micron order. Such a substrate can be manufactured by a lithography technique called LIGA process having excellent linearity, resolution and transmission. In this LIGA process, use is made of an X-ray called SOR radiation emitted by a synchrotron and a deep recess having a high aspect ratio can be formed precisely with micron order even if a resist has a thickness of about 1 mm.

It should be noted that when (110) silicon single crystal wafer is used as the substrate of the integrated type optical unit of the optical pick-up head and the anisotropic etching is carried out, (111) surfaces appear in two directions, so that upright side walls having these (111) surfaces may be utilized for positioning. However, in this case, the side walls are not perpendicular to each other. Furthermore, by using such a substrate it is possible to form a substrate having required precision in three directions.

Moreover, the integrated type optical unit according to the invention may be applied to an optical record medium other than the magneto-optical record medium. In the so far explained embodiments, a beam shaping faculty may be adopted in order to change an elliptical cross section of the laser beam emitted by the semiconductor laser into a circular cross section.

In the above mentioned embodiments of the optical pick-up head according to the invention, the multi-image plane parallel plate with the polarizing film is provided with the polarizing beam splitting function for separating the return beam from the incident beam, the polarizing beam splitting function for detecting the MO signal from the return beam by the differential method and the astigmatism generating function for introducing the astigmatism for detecting the FES, and further the astigmatism is generated in a direction which is inclined by 45° with respect to the information track on the optical record medium. Therefore, the optical unit can be small in size, light in weight and cheap in cost, and furthermore leakage of the PP signal into the FES can be effectively prevented so that the focus servo can be performed accurately and stably.

Further, in the above mentioned embodiments of the integrated type optical unit according to the invention, the semiconductor laser, signal detecting photodetector and beam splitting element are positioned and mounted on the substrate having the positioning guides formed by lithography, and thus the assembling can be performed easily and precisely, while the optical unit can endeavor sever conditions.

FIG. 15 is a schematic view showing a basic construction of the optical pick-up head according to the invention. In the present embodiment, portions similar to those of the previous embodiments are denoted by the same reference numerals used in the previous embodiments. An integrated type optical unit 71 comprises semiconductor laser 11, signal detecting photodetector 18 and a beam splitting member 72 for separating a return light beam $L_R$ from an incident light beam $L_I$. A laser beam emitted by the semiconductor laser 11 is reflected by the beam splitting member 72 and is focused on an optical record medium 17 by means of an objective lens 16 as a fine spot.

The return beam reflected by the optical record medium 17 is made incident again upon the beam splitting member 72 by means of the objective lens 16 and is transmitted through the beam splitting member. The return beam emanating from the beam splitting member 72 is made incident upon the signal detecting photodetector 18, and FES, TES and MO signal can be derived by processing outputs of the photodetector 18.

The beam splitting member 72 may be formed by semitransparent plate or prism utilizing reflection and transmission, grating in which the incident beam is obtained as a zero order beam and the return beam is divided into higher order beams, polarizing beam splitter constructing an optical isolator together with a ¼ wavelength plate.

Now it is assumed that a distance between the semiconductor laser 11 and the beam splitting member 72 is a and a distance between the beam splitting member and the signal detecting photodetector 18 is b. When a=b, the semiconductor laser 11 and the photodetector 18 become optically conjugate. Therefore, by mounting and positioning these elements as the integrated type optical unit 71, interference is introduced into the common optical path, an optical property is not disturbed.

It should be noted that the positions of the semiconductor laser 11 and photodetector 18 may be exchanged mutually. In this case, the light beam emitted by the semiconductor laser is transmitted through the beam splitting member 72 and the return beam is reflected by the beam splitting member. Moreover, if a reflecting member is arranged behind the beam splitting member in the optical path of the return beam, the semiconductor laser and photodetector may be arranged on the same side of the beam splitting member.

Figure 16:
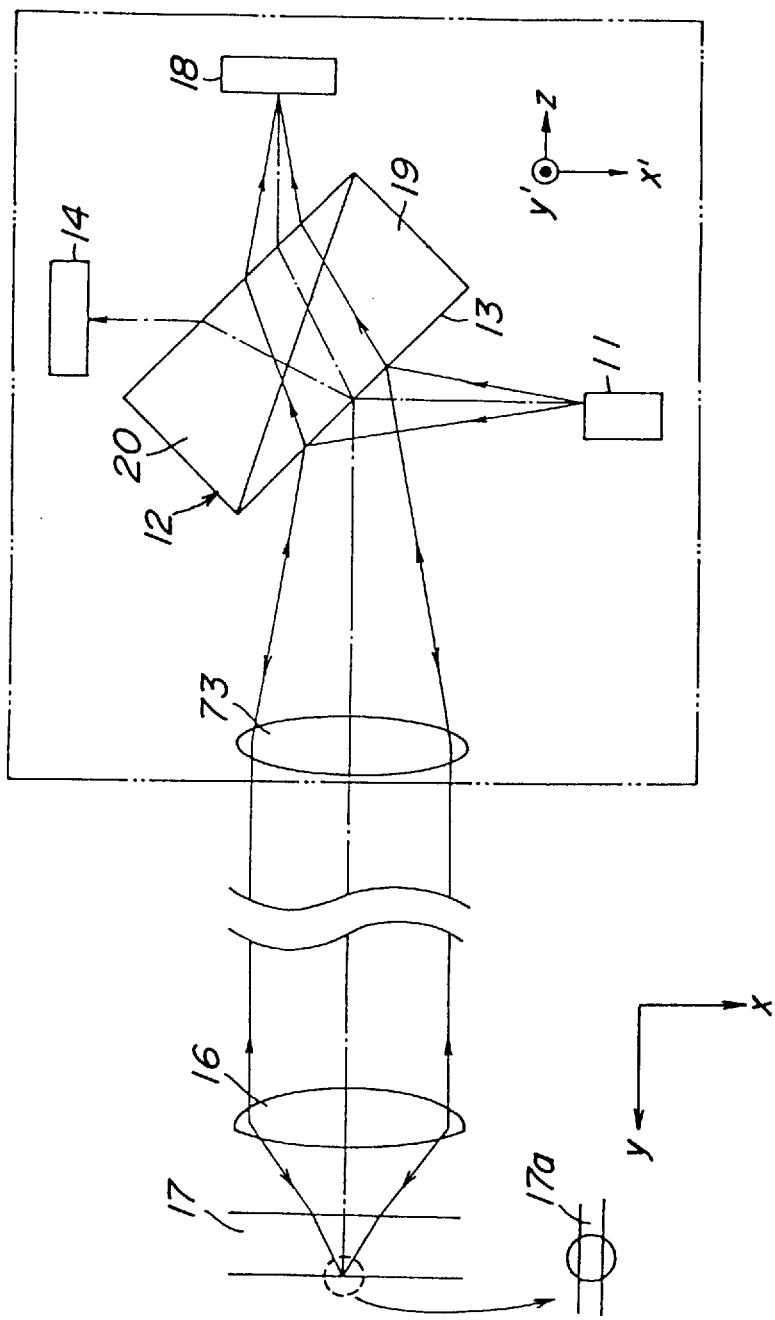
FIG. 16 is a schematic view showing the whole construction of the fourth embodiment.

FIG. 16 is a schematic view depicting a fourth embodiment of the optical pick-up head including the integrated type optical unit illustrated in FIG. 15. The optical pick-up head according to the present embodiment is used for the magneto-optical record medium and is constructed in accordance with the infinite method. A diverging linearly polarized laser beam emitted by a semiconductor laser 11 is made incident upon a multi-image plane parallel plate 12 having a polarizing film applied on an incident surface. A light flux transmitted through the polarizing film 13 and multi-image plane parallel plate 12 is received by a monitoring photodetector 14 and an output power of the semiconductor laser 11 is controlled in accordance with an output of the photodetector 14, A light flux reflected by the polarizing film 13 is converted into a parallel beam by means of a collimator lens 73 and then the parallel beam is focused by an objective lens 16 on an information track 17a of a magneto-optical record medium 17 an a very small spot.

A return beam reflected by the magneto-optical record medium 17 is made incident upon the polarizing film 13 by means of the objective lens 16 and collimator lens 73 and is transmitted through the polarizing film 13. In this manner, the return beam is separated from the incident beam and is made incident upon the plane parallel plate 12. The return beam impinging upon the plane parallel plate 12 is transmitted through and refracted by the plane parallel plate, so that astigmatism is introduced into the return beam. At the same time, the return bean is divided into a plurality of beams by the polarizing beam splitting function of the plane parallel plate 12, and these light beams are received by a signal detecting photodetector 18. By suitably processing outputs of the photodetector 18, it is possible to derive MO signal, FES and TES.

The plane parallel plate 12 is formed by two triangular prisms 19 and 20 made of birefringent material. In the present embodiment, the prisms 19 and 20 are made of lithium niobate and optic axes of these prisms are arranged in the same manner as that of the first embodiment illustrated in FIGS. 3 to 6. Therefore, from the plane parallel plate 12 there are emanated three light beams OE, EO and OO+EE. These three light beams are received by three light receiving units 21, 22 and 23 of the signal detecting photodetector 18 as shown in FIG. 17. The signal detecting photodetector 18 receiving the return beam emanating from the plane parallel plate 12 is arranged at a beat image point of the astigmatism introduced by the plane parallel plate, i.e. a middle point between a focal point in the x' direction and a focal point in the y' direction.

Also in the present embodiment, the MO signal can be obtained by deriving a difference between outputs of the light receiving units 21 and 22, the FES can be attained by the differential method, and the TES can be obtained by the PP method. A ratio of intensities of the light beams impinging upon these light receiving units 21, 22 and 23 may be set at will by suitably selecting an angle formed by the optic axes of the first and second triangular prisms 19 and 20. Further, when said angle is set to 90° to form the plane parallel plate 12 as a Wollaston's prism, an intensity of the light beam (OO+EE) becomes zero. Then, the signal detecting photodetector 18 may include two light receiving units 21 and 22 as illustrated in FIG. 9.

FIGS. 18A and 18B are schematic side and plan views of a fifth embodiment of the optical pick-up head according to the invention including the integrated type optical unit. In the present embodiment, in a mounting substrate 81 made of silicon wafers and having a (110) upper most surface, there are formed upright recesses and upright walls having (111) side walls, and semiconductor laser 11, multi-image plane parallel plate 12, monitoring photodetector 14 and signal detecting photodetector 18 are mounted on the substrate 81 by utilizing the side walls as positioning guides, while these elements are adjusted at least in optical axes thereof.

The upright recesses and upright walls having the {111} side walls can be formed in the silicon wafer precisely by utilizing the anisotropic etching which has been widely used in the precise machining field. As explained above, by performing the isotropic etching by providing a mask having an aperture extending in <1$\bar{1}$2> or <$\bar{1}$12> directions on an upper (110) surface of the silicon wafer, it is possible to form deep recesses up to 500 $\mu$m with an error in a direction of width smaller than 3 $\mu$m due to the fact that the extremely large ratio of the etching rate for crystal plane (110) to the etching rate for crystal plane (111). The ratio in these etching rates may amount to 180:1. For instance, it is possible to form a recess having 1.2 mm with an error in a direction of a width can be kept smaller than 7 $\mu$m.

The mounting substrate 81 is formed by (110) silicon wafers 82 and 83 which are jointed together by means of an etching stopper layer 84. When the upper surface of the silicon wafer is set to (110), there are formed four upright side walls of (111) and angles between these side walls surfaces become 109.5° and 70.5° as shown in FIG. 19A. Therefore, it is possible to form recesses 85, 86 and 87 having {111} upright side walls as shown in FIG. 18B by the anisotropic etching. A thickness of the first and second silicon wafers 82 and 83 is preferably set to 0.3–0.5 mm.

In case of forming the {111} walls in the (110) silicon wafer by the anisotropical etching, the following two points should be taken into account.

First, there are formed two (111) surfaces in a bottom of a recess which are not parallel with the upper surface of the silicon wafer in addition to the four upright (111) side walls. FIG. 19B is a cross sectional view of the recess formed in the silicon wafer by the anisotropic etching cut along the z axis and viewed from an arrow a in FIG. 19A. As shown in FIG. 19B, said two (111) surfaces are inclined by 35.3° with respect to the upper surface of the wafer, There inclined surfaces start from opposite corners having an angle of 70.5°. An area of the inclined surface is gradually increased in accordance with a progress of the etching, and finally the two inclined (111) surfaces are joined together so that the bottom of the recess is fully formed by the inclined surfaces, This will be further explained with reference of FIGS. 20A, 20B and 21A, 21B. FIG. 20A is a plan view and FIG. 20B is a cross sectional view cut along a line A—A in FIG. 20A, and FIG. 21A is a plan view and FIG. 21B is a cross sectional view cut along a line A—A in FIG. 21A. FIGS. 20A and 20B illustrate a configuration of a recess during an etching process, in which (111) inclined surfaces are formed in a part of a bottom of the recess, and FIGS. 21A and 21B depict the same at an end of the etching process, in which the whole bottom surface is formed by the inclined surfaces. The anisotropic etching is automatically stopped in the condition shown in FIGS. 21A and 21B and all walls defining the recess are formed by (111) surfaces. Therefore, a size of an etching mask corresponding to the corners of 70.5° has to be designed by considering a necessary depth of the recess and a required area of a flat bottom portion. When a depth of the recess is represented by d, a flat bottom portion can be formed from a point which is separated from the 70.5° corner by a distance 1=d/tan35.5°.

Second, due to the etching there appear higher order surfaces at a convex corner, so that the corner is liable to be rounded and a required precision could not be obtained. In order to mitigate such a drawback, it is preferable to correct a configuration of the mask. This has been explained in detail in B. Puers and W. Sansen, "Compensation Structures for Convex Corner Micro machining in Silicon", Sensors and Actuators, A21–A23, 1990, pp. 1036–1041.

Now the structure of the optical unit illustrated in FIGS. 18A and 18B will be further explained in detail. The semiconductor laser 11 is secured to a stem 88 made of good heat conducting material such as metal and the stem is mounted in the recess 85. When the semiconductor laser 11 is secured to the stem 88, the semiconductor laser is positioned with respect to the stem. In the recess 86, the multi-image plane parallel plate 12 as well as the monitoring photodetector 14 are positioned and mounted. The signal detecting photodetector 18 is positioned and mounted in the recess 87.

In the present embodiment, thicknesses of the optical elements have required precision, and they are mounted on the substrate 81 while the positioning in the z axis is carried out. Therefore, for the semiconductor laser 11 and signal detecting photodetector 18, the positioning in the x' and y' directions Is required. However, if the optical elements have micron order precision also in the x' and y' directions, it is no more necessary to perform the positioning in these x' and y' directions. Further if a required precision is attained in one of the x' and y' directions, it is necessary to carry out positioning only in the other direction. In this manner, the process of positioning can be simplified.

Also in the present embodiment, the positioning of the optical elements in the x' and y' directions can be performed by using an optical system which can return a parallel light beam toward a light source such as corner cube prism and cat's eye lens system, In the present embodiment, all the optical elements shown in FIG. 11B can be mounted on the square substrate having a side of 7 mm. It should be noted that the present embodiment may be applied not only to the optical head for the magneto-optical record medium but also to any type of optical head including at least semiconductor lager photodetector and beam splitting element.

FIG. 22 is a schematic view showing an integrated type optical unit of a sixth embodiment of the optical pick-up head according to the invention. In the present embodiment, a silicon substrate 91 comprised a recess 92 for mounting the semiconductor laser 11, a recess 93 for mounting the multi-image plane parallel plate 12 formed by the triangular prisms 19 and 20 made of birefringent material and a recess 94 for mounting the signal detecting photodetector 18. In FIG. 22, the monitoring photodetector and a recess therefor are not shown for the sake of simplicity, The mounting substrate 91 is formed by anisotropically etching (110) silicon wafer like as the fifth embodiment. In the present embodiment, the recesses 92 and 93 for mounting the stem 88 to which the semiconductor laser 11 is secured and the multi-image plane parallel plate 12 have sawtooth-shaped side walls.

In the present embodiment, there are formed spaces between the stem 88 and multi-image plane parallel plate 12 and the upright side walls of the recesses 92 and 93, and an excessive amount of a adhesive agent can flow into these spaces. It should be noted that a recess having sawtooth-shaped upright side walls can be formed in various shapes as shown in FIGS. 23A, 23B and 23C. In FIG. 23A, side walls are formed to have convex corners of 109.5°, in FIG. 23B side walls are formed to have convex corners of 70.5°, and in FIG. 23C side walls are formed to have convex corners of 70.5° and 109.5°.

FIGS. 24A, 24B and 24C illustrate the integrated optical unit of a seventh embodiment of the optical pick-up head according to the invention. In the present embodiment, a mounting substrate 101 is formed by anisotropically etching a (100) silicon wafer and recesses 102–105 having inclined side walls are formed with a precision of micron order. In the specification, there recesses 102–105 are called pyramid recesses. The inclined side walls of the pyramid recesses 102–105 are formed by (111) surfaces which are inclined by about 54.7° with respect to an upper surface of the mounting substrate 101.

In bottoms of the pyramid recesses 102–105 there are formed through holes 106–109 respectively and these through holes are communicated with an air suction device 110 as shown in FIG. 24C so that optical elements can be positioned in respective pyramid recesses by the air suction force. That is, the stem 88 having the semiconductor laser 11 secured thereto is positioned and mounted in the pyramid recess 102, the multi-image plane parallel plate 12 is positioned and mounted in the pyramid recess 103, the signal detecting photodetector 18 is positioned and mounted in the pyramid recess 105 and the monitoring photodetector 14 is positioned and mounted in the pyramid recess 105. In this case, the inclined side walls of respective pyramid recesses 102–105 serve an collets for receiving respective optical elements, and thus very accurate positioning matched to precision of abutment surfaces can be realized. In this case, the etching proceeds in such a manner that a size of a bottom surface is reduced while a pyramid shape having a size corresponding to the mask aperture, and therefore a required precision for the abutment surfaces of the pyramid recesses can be obtained although an etching time is prolonged to some extent.

Figure 25A:
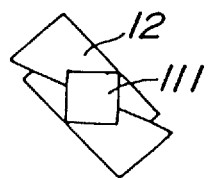
FIGS. 25A and 25B are schematic view depicting a manner of mounting a beam splitting element shown in FIG. 24B.
Figure 25B:
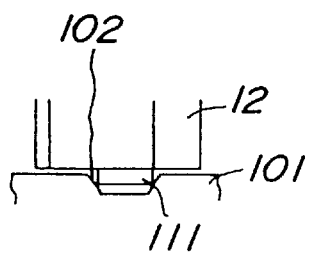

As can be seen from FIGS. 24A and 24B, the stem 88 and photodetectors 14, 18 can be placed in position by the air suction force into the pyramid recesses 102, 104 and 105, respectively, because these recesses have configurations corresponding to these optical elements. However, the multi-image plane parallel plate 12 is inclined by 45° with respect to the sides of the pyramid recess 103, and thus this plate could not be directly positioned and mounted in the pyramid recess. In the present embodiment, on a rear surface of the multi-image plane parallel plate 12 is secured a square stud 111 as shown in FIG. 25A and this stud 111 is positioned and mounted into the pyramid recess 102 an depicted in FIG. 25B. The stud 111 may be formed by etching a (100) silicon wafer.

FIGS. 26A, 26B and 26C illustrate another method of positioning and mounting the multi-image plane parallel plate 12 into the pyramid recess 102. In this method, a mounting member 112 in formed by anisotropically etching a (100) silicon wafer to have a pyramid recess 113 and a through hole 114 is formed in a bottom of the pyramid recess 114 as shown in FIG. 26A. Then, the multi-image plane parallel plate 12 is positioned and mounted onto the pyramid recess 113 by utilizing the air auction force. Then, the mounting member 112 having the plate 12 mounted thereon is positioned and mounted onto the pyramid recess 102 formed in the mounting substrate 101 by utilizing the air suction force an shown in FIG. 26C.

In the present embodiment, the optical elements are positioned and mounted in the mounting substrate 101 having pyramid recesses including the inclined side walls serving as collets, so that an error in mounting can be less than about ±5 $\mu$m.

Figure 27A:
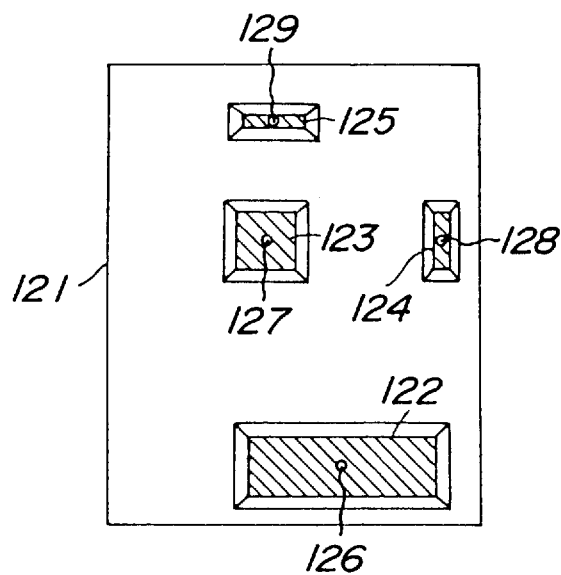
FIGS. 27A, 27B and 27C show a manner of mounting optical elements on a mounting substrate.

Upon mounting the optical elements on the mounting substrate 101 by utilizing the air suction force like as the collet, a substrate similar to the (100) silicon wafer shown in FIG. 24A may be used a collet jig for positioning and mounting the optical elements onto the mounting substrate 101. FIG. 27A shows such a collet jig 121. In which pyramid recesses 122–125 are formed by the anisotropic etching and through holes 126–129 are formed in respective recesses. The collet jig 121 has an entirely same configuration as that of the mounting substrate 101.

Figure 27B:
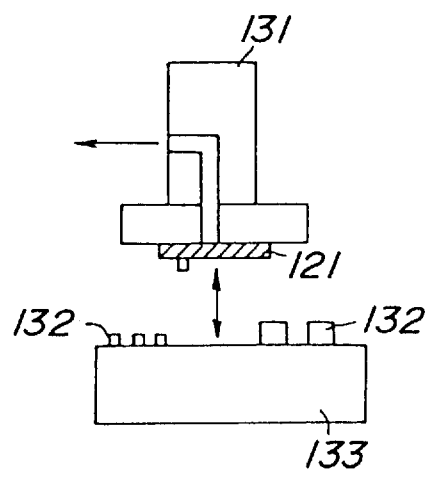
Figure 27C:
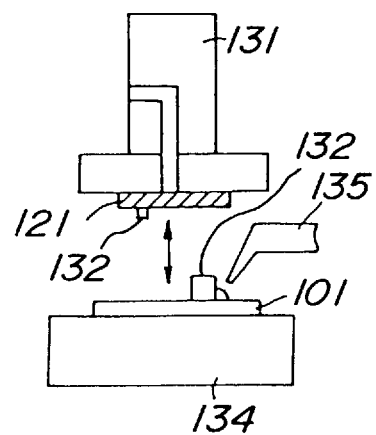

As illustrated in FIG. 27B, the collet jig 121 is secured to an arm 131 which can be moved very accurately. Given optical elements 132 are placed on a platform 133. At first, the arm 131 is moved toward the platform 133 and the optical elements 132 on the platform are transferred to the collet jig 121 by the air suction force. Then the arm 131 having the collet jig 121 secured thereto is moved away from the platform 133 and is then moved toward a platform 134 on which the mounting substrate 101 is placed as shown in FIG. 27C. Then, the optical elements 132 supporting by the collet jig 121 are transferred onto the mounting substrate 101 and are secured thereto by an adhesive agent supplied from a dispenser nozzle 135. The arm 131 is constructed to move between the platform 133 having the collet jig 121 and the platform 134 supporting the mounting substrate 101 in a precise manner. Platforms 134 supporting mounting substrates 101 may be successively indexed into an optical element mounting position.

In the manner explained above, the optical elements 132 can be positioned and mounted on the mounting substrate 101 with a micron order precision. In this method, the mounting substrate 101 may be replaced by a simple mounting substrate having a flat upper surface. Moreover, all the optical elements 132 may be transferred to the collet jig 121 simultaneously and then after aligning heights of the optical elements on a same plane, all the optical elements may be transferred to the mounting substrate 101 simultaneously. Alternatively, the optical elements may be transferred one by one.

FIGS. 28A to 28E show a mounting substrate unit of the integrated type optical unit of an eighth embodiment of the optical pick-up head according to the invention. In this embodiment, the mounting substrate unit comprises a base substrate 141 depicted in FIG. 28A, a spacer substrate 142 shown in FIG. 28B and a positioning substrate 143 illustrated in FIG. 28C. The base substrate 141 is formed by a silicon wafer having a thickness of about 0.5 mm. The spacer substrate 142 is formed by anisotropically etching a (100) silicon wafer having a thickness of about 0.3–0.5 mm and has formed therein an opening 144 defined by inclined side walls 145. The positioning substrate 143 shown in FIG. 28C is formed by anisotropically etching a (110) silicon wafer having a thickness of about 0.1–0.2 mm and has an opening 146 defined by upright side walls and inclined surfaces 147. After forming the spacer substrate 142 and positioning substrate 143 are formed by the etching, the are placed on the base substrate 141 in position and these three substrates are joined with each other by adhesive agent as depicted in FIG. 28D. FIG. 28E is a cross sectional view of the thus formed mounting substrate unit 147 cut along a line A—A in FIG. 28D.

In the present embodiment, it is possible to form a deep recess compared with a recess formed in a (110) silicon wafer by the anisotropic etching, so that the positioning precision of the optical elements can be further improved. It should be noted that the positioning substrate 143 may be formed from a (100) silicon wafer. In this case, an opening formed in a positioning substrate 148 formed by a (100) silicon wafer is defined inclined side walls 149 as shown in FIG. 28F. These inclined side walls 149 serve as guides for the insertion of an optical element, so that the positioning and mounting step can be carried out easily.

FIGS. 29A to 29C show a mounting substrate unit of the integrated type optical unit of a ninth embodiment of the optical pick-up head according to the invention. In the present embodiment, on a base substrate 151 is secured a spacer substrate 152 and a polyimide film 153 having a thickness of about 100 μm is applied on a surface of the spacer substrate 152. At first, a mask having a given opening is provided in the polyimide film 153 and then an opening 154 is formed in the polyimide film 152 to expose the underlying spacer substrate 152 as depicted in FIG. 29A by a&reactive ion etching (RIE). Then, the spacer substrate 152 is subjected to an isotropic etching via the opening 154 to form a recess 155 extending to a surface of the base substrate 151. The isotropic etching may be performed by using an etchant HF+NHO$_3$. In this manner, a mounting substrate unit 156 shown in FIG. 29C can be obtained. FIG. 29C is a cross sectional view cut along a line A—A in FIG. 29B. The base substrate 151 may be made of a material which can stop the isotropic etching or a thin polyimide or nitride film serving as a stopper for the isotropic etching may be applied on a substrate.

Like as the embodiment shown in FIGS. 28A to 28F, in the present embodiment, it is possible to form a deep recess having small inclined (111) side walls as compared with the mounting substrate which is formed by anisotropically etching a single (110) silicon wafer, and therefore the optical elements pan be positioned very precisely. Moreover, in the polyimide film 153, it in possible to form the opening 154 having a large depth up to 100 μm by the reactive ion etching with a side or under etch of several micron meters. Further, the spacer substrate 152 is etched isotropically, it is possible to form a positioning pattern extending in any direction, Instead of "polyimide+RIE", it in also possible to adopt "thick resist+UV expose" or "photosensitive polyimide+UV expose".

FIG. 30 is a schematic view showing the integrated type optical unit of a tenth embodiment of the optical pick-up head according to the invention. In the previous embodiments of the integrated type optical unit, the optical elements are positioned with reference to the side walls of the recesses and cut out portions, but in the present embodiment, the optical elements are positioned with reference to upright walls protruding from a surface of a mounting substrate. In FIG. 30, positioning projections are denoted by hatching, A mounting substrate 201 is formed by anisotropically etching a (110) silicon wafer to remove silicon material other than the positioning projections by a depth of 1.2 mm. In FIG. 30, surface except for upper and lower surfaces and a left side wall are formed by (111) upright walls obtained by the etching. A right side wall is formed by a (111) upright wall having a height of 1.2 mm and a remaining wall portions having a thickness of 0.5 mm is formed by dicer cut. A left upright wall of a left lower projection 202 is coated with a film for joining the semiconductor laser 11 and the semiconductor laser 11 is positioned with a junction down in order to dissipate a heat from the semiconductor laser 11 and is mounted on the upright wall of the projection 202. The multi-image plane parallel plate 12 is arranged in position by means of 109.5° corners of projections 203 and 204 such that the plate could not be rotated and is secured to these corners by an adhesive agent. It should be noted that a rotation of the multi-image plane parallel plate 12 does not affect the conjugate distance between the semiconductor laser 11 and the signal detecting photodetector 18 so much, and therefore a rather large error is allowed for a size of the corners of the projections 203 and 204.

Projections 205 and 206 are formed such that their right hand upright walls aligned in a same plane and the signal detecting photodetector 18 is mounted on theme right hand upright walls of the projections 205 and 206 such that a position of the photodetector 18 can be adjusted in x' and y' directions. Upper upright walls of the projections 204 and 205 are aligned in a same plane, because these upright walls are formed by the dice cut. The monitoring photodetector 14 is mounted on theme upper upright walls of the projections 204 and 205 such that a position of the photodetector can be adjusted in y' and z directions. To the photodetectors 14 and 18 are secured wiring submounts 207 and 208, respectively.

The optical elements 11, 12, 14 and 18 have a height of about 1 mm and the optical axes of these elements are set substantially at a middle between the upper and lower surfaces of the mounting substrate 201. It should be noted that positioning projections 202–206 have to be formed such that they do not interrupt the optical path. In the present embodiment, although the projections 202–206 having a relatively large height are formed by the etching, there is not formed an inclined surface in the surface of the substrate 201, so that a corner of 70.5° is not used in the etched recess. Moreover, even if inclined (111) surfaces are formed due to adjacent patterns to be formed in the silicon wafer, bottom portions in areas at which the optical elements are mounted are formed to be flat.

In the present embodiment, the semiconductor laser 11 and signal detecting photodetector 18 are secured to the (111) upright walls having the same orientation and the multi-image plane parallel plate 12 is secured to the convex corners of the projections 203 and 204 in such a manner that the plate 12 is not rotated, and therefore the optical conjugating relationship of the semiconductor laser 11, multi-image plane parallel plate 12 and signal detecting photodetector 18 can be attained easily and these optical elements can be arranged in position in the direction of the optical axes with an error of micron order.

In the present embodiment, the signal detecting photodetector 18 is adjusted in the x' and y' directions, but if the photodetector can be manufactured to have a precision of micron order in the x' and y' directions, the above adjustment may be dispensed with. Moreover, if a required precision can be attained in the y' direction, it is necessary to perform only in the x' direction.

The adjustment in the x' and y' of optical elements can be carried out by using the corner cube prism or cat's eye lens for the infinite optical system having a collimator lens which is coupled with the optical unit.

In the manner explained above, in the present embodiment, all the optical elements shown in FIG. 30 can be mounted on the mounting substrate 201 having a size of 3.5 mm×7 mm×1.7 mm. The optical unit shown in FIG. 30 may be used not only for the optical information reading and/or writing apparatus using the magneto-optical record medium, but also for an apparatus for reading and/or writing information from and/or on any type of optical record medium.

FIG. 31 is a perspective view depicting a part of the integrated type optical unit of an eleventh embodiment of the optical pick-up head according to the invention, In the present embodiment, a mounting substrate unit 220 is formed by joining a (110) silicon wafer 222 on a (100) silicon wafer 221 having a thickness of about 0.5 mm via an etching stopper layer 223 made of, for instance $SiO_2$. The joining may be carried out by direct joining or anode joining. The (119) silicon wafer 222 is subjected to the anisotropic etching to form projections 224–227 having upright walls and optical elements are mounted on the (110) silicon substrate 222 like as the embodiment shown in FIG. 30. In FIG. 31 only the multi-image plane parallel plate 12 and signal detecting photodetector 18 are shown. By providing the etching stopper layer 223, a precision of etching depth and A flatness of the etched bottom can be attained easily, and thus the etching process can be conducted easily.

In the present embodiment, in order to facilitate the adjustment of optical elements in x' and/or y' directions and to prevent a displacement of the optical elements during a cure period of an adhesive agent, air sucking holes are formed in the projections. As shown in FIG. 31, holes 228 and 229 are formed in the projections 226 and 227, respectively for mounting the signal detecting photodetector 18. FIG. 32 is a cross sectional view cut along a line A—A in FIG. 30 and shows the hole 229 formed in the projection 227. As shown in FIG. 32, the hole 229 is communicated with a hole 230 formed in the (100) silicon substrate 221.

Now a method of forming the holes 228, 229 will be explained. At first, the holes 228 and 219 are formed the (110) silicon substrate 222 by etching from a rear surface thereof. In this case, a length and a width of a mask for the etching are determined such that the etching is automatically stopped at a depth of about 0.8–1 mm due to inclined (111) surfaces. The etching stopper layer 223 is provided on the surface of the (100) silicon wafer 221 and the hole 230 is formed by etching in the (100) silicon wafer via an opening 231 formed in the etching stopper layer 223. Then, the (110) silicon wafer 222 is joined on the (100) silicon wafer 221 via the etching stopper layer 223 and the (110) silicon wafer is subjected to the anisotropic etching to form the projections for mounting the optical elements. In this case, the previously formed air suction holes are defined by (111) surfaces, so that a shape of these holes is not changed during anisotropic etching for forming the projections.

FIGS. 33A, 33B and FIGS. 34A, 34B illustrate shapes of a recess formed in a (100) silicon wafer by the anisotropic etching. In case of anisotropically etching the (100) silicon wafer, there is formed a pyramid recess and side walls are inclined by 54.7° with respect to an upper surface. FIGS. 33A illustrates a condition during the etching and FIG. 33B is a cross section cut along a line A—A in FIG. 33A. In this state, there is still remained a (100) bottom surface other than the four inclined (111) surfaces. The etching is automatically stopped in a condition shown in FIG. 34A. The recess is finally defined by the four (111) surfaces. Therefore, when a short side of the rectangle is denoted by 21, a depth d of the recess amounts to 1×tan 54.7°. Therefore, a thickness of the silicon wafer is smaller than the depth d of the recess, there can be formed the through holes in the (100) silicon wafer.

The (110) silicon wafer and (100) silicon wafer processed in the manner explained above are then joined together and the air suction holes 228 and 229 communicated with the holes 230 formed in the (100) silicon wafer 221 are obtained. By sucking an air through these holes, the photodetector 18 can be sucked to the right upright side walls of the projections 226 and 227 and thus can be easily adjusted in the x' and y' directions. Further, during a cure period of an adhesive agent, the photodetector 18 can be kept in position. It should be noted that such air suction holes may be formed for other optical elements such as the semiconductor laser 11 and monitoring photodetector 18.

Figure 35:
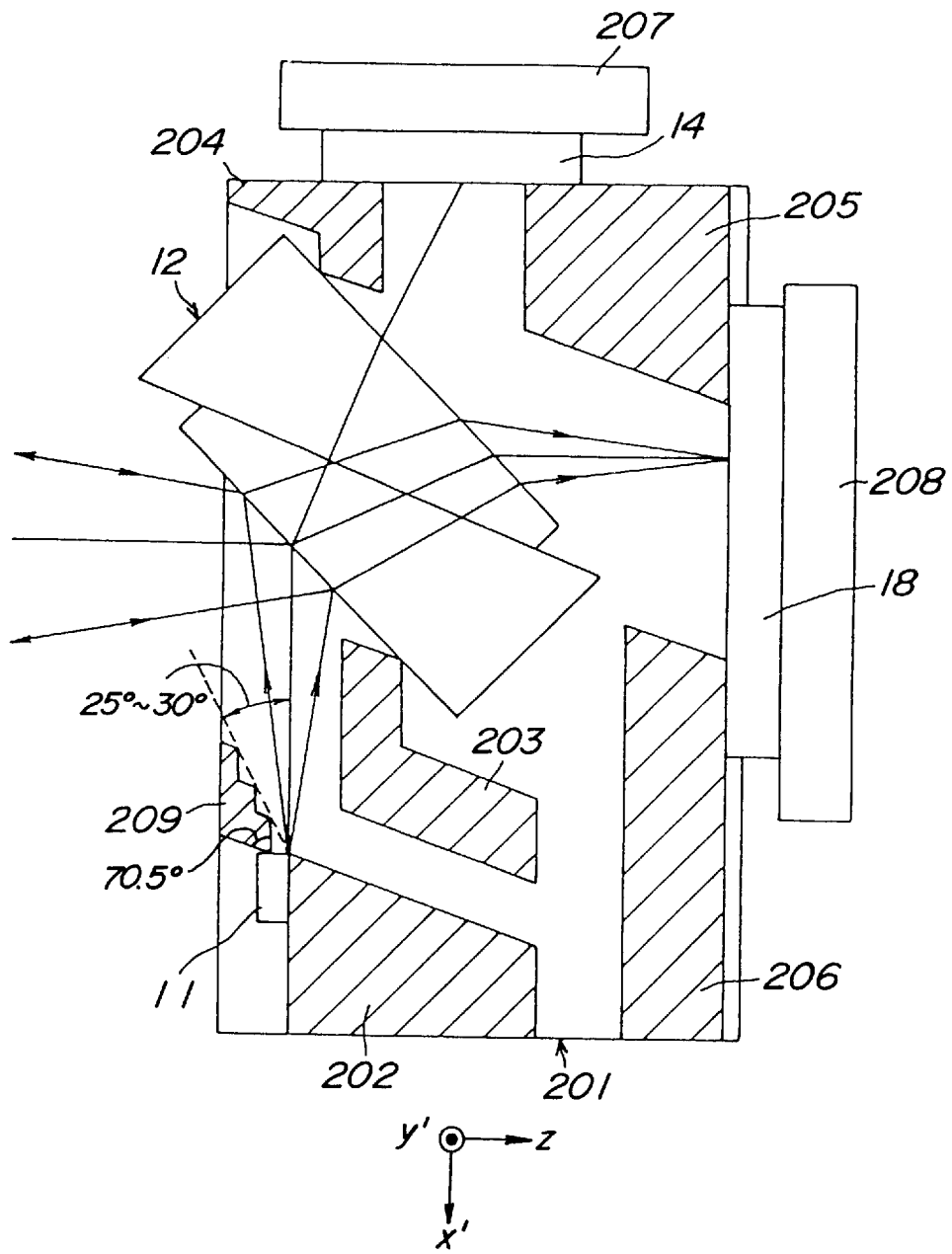
FIG. 35 is a schematic view representing a modification of the tenth embodiment.

FIG. 35 is a schematic view showing the integrated type optical unit of a modification of the tenth embodiment of the optical pick-up head according to the invention shown in FIG. 30. In this modified embodiment, the mounting substrate 201 further comprises a mounting and positioning projection 209 and its 70.5° convex corner is used as a guide for positioning the semiconductor laser 11 in the optical axis. The remaining construction of this modification is identical with the tenth embodiment depicted in FIG. 30. As explained above, the semiconductor laser 11 is mounted on the left hand upright side wall of the projection 202 with the junction down. The semiconductor laser 11 has a thickness of about 100 μm and its light emitting plane is separated by several micron meters from a surface which is secured to the upright side wall of the projection 202. Therefore, the corner of the projection 209 can be brought into contact with a light emitting surface of the semiconductor laser 11 without shielding the laser beam emitted by the semiconductor laser.

As shown in FIG. 35, the projection 209 is formed to be out of a region extending from the optical axis of the laser beam by 25°–30°, so that the laser beam is prevented from being diffracted by the projection in a near field. Further, the positioning corner of 70.5° is formed with a high precision. In the present embodiment, the semiconductor laser 11 is positioned by the projections 202 and 209 in the x' and z directions, and thus the relatively rough adjustment of the semiconductor laser in the y' direction is required.

Advantages of the integrated type optical units according to the invention may be summarized as follows:

(1) The optical elements can be mounted on the single mounting substrate or single mounting substrate unit precisely in a compact manner, so that the optical unit can be highly stabilized and can be made small in size, light in weight and cheap in cost.

(2) The semiconductor laser, beam splitting element and signal detecting photodetector can be mounted such that distances between these elements in the optical axes can be maintained with a precision of micron order and thus the adjustment during the mounting can be extremely simplified. In case of adopting the infinite optical system, the adjustment can be further simplified by using a simple optical system such as corner cube prism and cat's eye lens.

Since the adjustment in the x' and y' directions does not interfere with the adjustment in the z direction, it is possible to perform the adjustment by intermediate property values.

(3) The number of adjusting steps can be materially reduced, because only the signal detecting photodetector or the signal detecting photodetector and semiconductor laser require the adjustment, (4) By using the optical elements having high precision, any adjustment can be dispensed with.

(5) The semiconductor laser, beam splitting element, signal detecting photodetector and monitoring photodetector can be mounted on the single mounting substrate having a very small size such as 3.5 mm×7 mm×1.7 mm. After mounting the optical elements, the mounting substrate is encapsulated and a package is filled with an inert gas. Then, a life time of the optical unit can be prolonged extremely.

(6) In the embodiments shown in FIGS. 30–35, the inclined (111) surface does not appear in the etched bottom and the convex corner of 70.5° is utilized to position the semiconductor laser only in the optical axis, and thus a required precision can be easily attained.

(7) In the embodiments shown in FIGS. 30–35, the semiconductor laser and signal detecting photodetector are positioned by the (111) surfaces oriented in the same direction and the multi-image plane parallel plate is mounted not to rotate, the distances between these elements measured along the optical axes can be kept with a precision of micron order.

FIGS. 36A and 36B show a twelfth embodiment of the optical pick-up head according to the invention. Also in the present embodiment, portions similar to those of the previous embodiments are denoted by the same reference numerals used in the previous embodiments. An integrated type optical unit 300 comprises a mounting substrate 301 on which a stem 88 having a semiconductor laser 11 secured thereto, beam splitting element such as a multi-image plane parallel plate 12, monitoring photodetector 14 and signal detecting photodetector 18 are mounted in position. The integrated type optical unit 300 may be one of the previous embodiments.

In the present embodiment, a reference end surface 302 is formed in the mounting substrate 301 such that the reference end surface is perpendicular to an optical axis of a light beam emanating from the optical unit 300 toward a collimator lens 73. When the mounting substrate 301 is formed by anisotropically etching the (110) silicon wafer like in the previous embodiment, the reference end surface 302 can be formed by the anisotropic etching. The reference end surface 302 may be formed by a dicer cut using a precise pattern obtained by photolithography.

In this manner, the optical elements of the integrated type optical unit 300 are positioned and mounted on the mounting substrate 301 precisely having the positioning recesses or projections. Therefore, a distance a between a light emitting point of the semiconductor laser 11 to the reflecting surface of the beam splitting element 12 measured along the x direction and a distance c between the light emitting point of the semiconductor laser 11 to the reference end surface 302 can be precisely determined. In the present embodiment, the mounting substrate 301 has a size of 5 mm×4 mm.

Figure 37A:
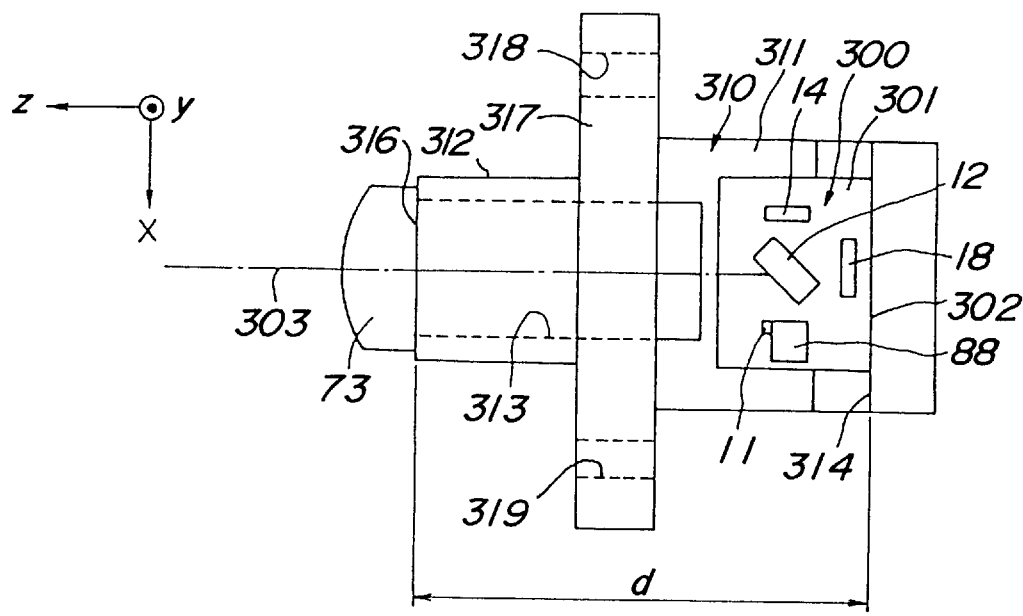
FIGS. 37A and 37B are schematic views depicting an optical unit of the twelfth embodiment.
Figure 37B:
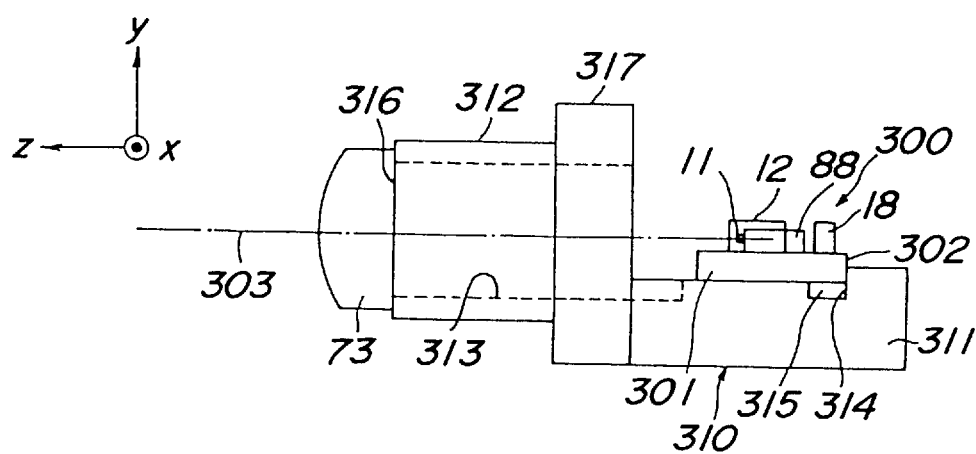
Figure 38A:
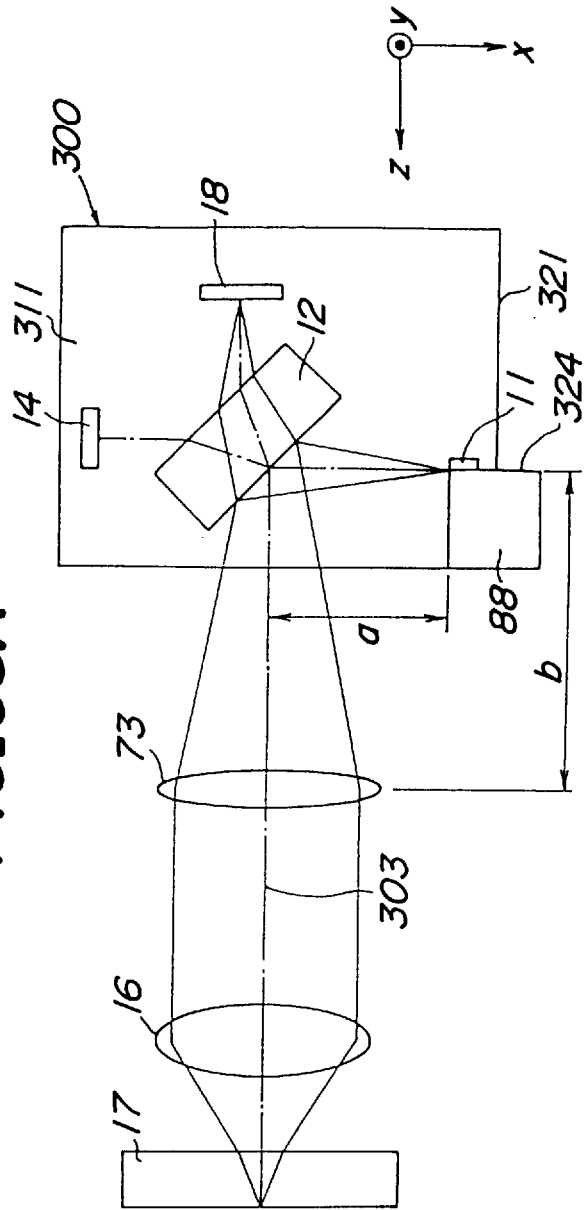
FIGS. 38A and 38B are schematic views showing a thirteenth embodiment of the optical pick-up head according to the invention.
Figure 38B:
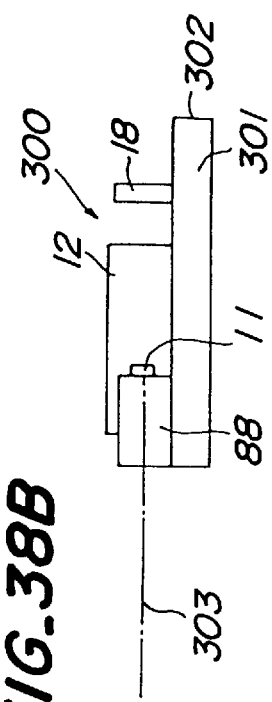

FIGS. 37A and 37B are plan and side views showing an assembly of said optical unit 300 and a base member 310. In the base member 310 there are formed a unit mounting portion 311 for mounting the optical unit 300 and a collimator lens mounting portion 312 having a through hole 313. The unit mounting portion 311 comprises an abutment surface 314 and the optical unit 300 is positioned by urging the reference side surface 302 against the abutment surface 314. In order to attain a positive surface contact between the reference end surface 302 and the abutment surface 314, an escape portion 315 is formed in an upper surface of the base member 310 in a vicinity of the abutment surface 314 as illustrated in FIG. 37B, In the collimator lens mounting portion 312, there is formed a mounting surface 316 at an opening of the through hole 313, and the collimator lens 73 is hermetically secured to this mounting surface 316. The base member 310 further comprises a flange portion 317, in which holes 318 and 319 are formed for coupling the base member with a pick-up chassis or a main body of a disk driver.

In this construction, a distance between the semiconductor laser 11 and the collimator lens 73, i.e. a distance a+b in FIG. 36A is determined by a focal length of the collimator lens. If this distance is determined precisely, the light beam emanating from the collimator lens 73 toward the objective lens 16 and optical record medium 17 is not a parallel beam, but is a converged or diverged light beam. Then aberrations introduced by the objective lens 16 become large and the information reading and/or writing property is deteriorated. The distances a and c shown in FIG. 36A can be determined precisely by using the positioning method utilizing the semiconductor manufacturing process, but the distance b between the reflecting surface of the beam splitting element 12 and the mounting surface 316 for the collimator lens 73 measured in the z direction in determined by the construction of the base member 311. When the reference end surface 302 of the mounting substrate 301 in urged against the abutment surface 314 of the base member 311 as shown in FIGS. 37A and 37B, the distance b may be expressed by b=d−c, wherein d in a distance between the abutment surface 314 and the collimator lens mounting surface 316. Therefore, if the distance d can be determined precisely, it is possible to delete the adjustment of the collimator lens 73 in the direction of the optical axis with respect to the base member 311.

In the present embodiment, the abutment surface 314 and collimator lens mounting surface 316 are set to be in parallel with each other, so that said distance d can be easily determined precisely. When the abutment surface 314 an d collimator lens mounting surface 316 are formed to be in parallel with each other, they can be formed by a milling machine with a precision smaller than 10 $\mu$m, while a posture of the base member 311 with respect to the milling machine is not changed and a cutting tool is not exchanged. In this manner, the adjustment of the collimator lens 73 in the direction of the optical axis 303 can be dispensed with.

In the present embodiment, since the adjustment of the collimator lens 73 in the direction of the optical axis 303 can be dispensed with, the number of assembling steps can be reduced and the number of parts and mechanisms for the adjustment can be decreased. Therefore, the optical pick-up head can be small in size, light in weight and cheap in cost. Moreover, the collimator lens mounting surface 316 is flat, the adjustment of the collimator lens 73 in the x-y plane can be performed. That is to say, in case of securing the base member 311 to a pick-up chassis or a main body of a disk driver, it is necessary to bring the optical axis 303 of the optical unit assembly to be coincided with the optical axis of the objective lens 16 which is secured to the pick-up chassis or main body of disk driver. In this case, since the collimator lens mounting surface 316 is a flat surface parallel with the x-y plane, the optical axis of the objective lens 16 can be positively coincided with the optical axis 303 oft he base member 311 by moving the collimator lens 73 in the x-y plane by means of a pin or pins from three or four directions. In the present embodiment, the holes 318 and 319 for securing the base member 311 to pick-up chassis or main body of disk driver are formed in the base member itself, so that the number of parts can be further decreased.

FIGS. 38A, 38B and 39A, 39B show a thirteenth embodiment of the optical pick-up head according to the invention. In the present embodiment, a surface 321 of the mounting substrate 301 of the optical unit 300 parallel with the optical axis 303 of the base member 310 is urged against an abutment surface 323 of a projection 322 formed in the mounting portion 311 of the base member 310 so that the mounting substrate 301 is arranged in position in the x direction. Further the stem 88 supporting the semiconductor laser 11 is formed to extend out of the mounting substrate 301 and a surface 324 of the stem 88 extending perpendicularly to the optical axis 303 is urged against a surface 325 of the projection 322 of the base member 310 extending perpendicular to the optical axis 303 to perform a positioning of the mounting substrate 301 with respect to the base member 310 in the z direction. It should be noted that the surface 325 of the projection 322 and the collimator lens mounting surface 316 are parallel with each other. The remaining construction of the present embodiment is similar to the embodiment illustrated in FIGS. 36 and 37.

Also in the present embodiment, the distance d between the collimator lens mounting surface 316 and the abutment surface 325 of the base member 310 can be determined precisely, it is possible to attain similar advantages as those of the previous embodiments shown in FIGS. 36 and 37. Moreover, in the present embodiment, the distance c (see FIG. 36A) between the semiconductor laser 11 to the end surface 302 of the mounting substrate 301 measured in the z direction can be determined precisely in a simple manner. That is, in the present embodiment, the positioning of the base member 310 in the z direction is performed by directly using the surface 324 of the stem 88 having the semiconductor laser 11 secured thereto, and thus the distance c shown in FIG. 36A does not relate to the distance d in FIG. 39A at all.

FIGS. 40A and 40B are plan and side views illustrating a fourteenth embodiment of the optical pick-up head according to the invention, In the present embodiment, the mounting substrate 301, collimator lens 73 and base member 310 are constructed like as the embodiment shown in FIGS. 36 and 37 and are hermetically sealed by a cover 331. The cover 331 comprises an upper portion 332 and a lower portion 333 and is secured to the flange portion 317 of the base member 310 such that the mounting portion 311 of the base member 310 is surrounded by the cover 331.

A plurality of electric connection pins 334 are provided on the lower portion 333 of the cover 331 and are connected to the semiconductor laser 11 and photodetectors 14. 18 by means of thin conductors 335. Upon providing the cover 331, at first the lower portion 333 is secured to the flange portion 317 and the elements 11, 14 and 18 are connected to the pins 334 by means of the conductors 335. Then, the upper portion 332 is arranged on the lower portion 333 and is secured thereto by, for instance an adhesive agent. It is preferable that the inside of the cover 331 is filled with an inert gas such as argon and nitrogen.

In the present embodiment, the optical unit 300 is hermetically shielded, and thus the semiconductor laser 11, beam splitting elements 12 and photodetectors 14, 18 can be effectively prevented from being deteriorated by dust and humidity. In this manner, it is possible to provide the optical pick-up head having a high reliability.

In the embodiment shown in FIGS. 36 and 37, the collimator lens mounting surface 316 and abutment surface 302 of the mounting substrate 301 are oriented in opposite directions, but according to the invention these surfaces may be oriented in the same direction. That is, the reference end surface of the mounting substrate 301 is set on a left hand side of the mounting substrate and the abutment surface of the base member 310 is provided on a left hand side of the mounting portion 311 of the base member 310. Also in this case, the distance d between the collimator lens mounting surface 316 and the abutment surface 314 of the base member 310 can be determined precisely with a precision of micron order.

Furthermore, the mounting substrate 301 and base member 310 of the embodiment illustrated in FIGS. 38 and 39 may be hermetically shielded by the cover 331 like as embodiment depicted in FIG. 40. Moreover, the semiconductor laser 11 may be directly secured to the mounting substrate 301 without using the stem 88.

What is claimed is:
1. An optical pick-up head for reading and/or recording information from and/or on a magneto-optical record medium comprising:

a semiconductor laser emitting a linearly polarized light flux;

an objective lens projecting said light flux onto a magneto-optical record medium as a fine spot;

a multi-image plane parallel plate arranged between said semiconductor laser and the objective lens in a converged return light flux reflected by said record medium, reflecting the linearly polarized light flux emitted by said semiconductor laser toward said objective lens and transmitting and refracting said return light flux to introduce astigmatism in the return light flux and to perform a polarizing beam splitting, said multi-image plane parallel plate including a first triangular prism and a second triangular prism which are made of birefringent material and are joined together; and a signal detecting photodetector receiving a plurality of light fluxes emanating from said multi-image plane parallel plate, detecting an information signal from outputs corresponding to mutually orthogonally polarized light components and detecting a focusing error signal from outputs corresponding to ordinary and extraordinary light components; wherein said multi-image plane parallel plate is arranged such that directions of major and minor axes of said astigmatism are inclined by 45 degrees with respect to a track direction in which an information track on the magneto-optical record medium extends, an optic axis of said first triangular prism is set such that said return light flux is divided into the ordinary light and extraordinary light having substantially identical intensities, a polarizing film is provided on a surface of the first triangular prism upon which said linearly polarized light flux and return light beam are made incident, and an optic axis of said second triangular prism is set to be inclined by a predetermined angle with respect to the optic axis of the first triangular prism.

2. An optical pick-up head according to claim 1, wherein said semiconductor laser is arranged such that a light spot formed by the objective lens on the magneto-optical record medium becomes an elliptical shape whose major axis is inclined by 45 degrees with respect to the information track, and a half wavelength plate is arranged between the polarizing film and the objective long such that a polarizing direction of the linearly polarized light flux emitted by the semiconductor laser and impinging upon the record medium become in parallel with the information track.

3. An optical pick-up head according to claim 1, wherein said semiconductor laser is arranged such that a light spot formed by the objective lens on the magneto-optical record medium becomes an elliptical shape whose major axis is perpendicular to the information track, and a first half wavelength plate is arranged between the semiconductor laser and the polarizing film and a second half wavelength plate is arranged between the polarizing film and the objective lens such that a polarizing direction of the linearly polarized light flux emitted by the semiconductor laser and impinging upon the record medium become in parallel with the information track.

4. An optical pick-up head according to claim 1, wherein an angle $\beta$ between the optic axis of the first triangular prism and the optic axis of the second triangular prism measured about the optical axis of the return beam is set to $45° \leq \beta$ ($\neq 90°$) $\leq 135°$, said return beam is divided into a first light beam containing both the ordinary and extraordinary light components of substantially identical intensities, and second and third light beams having polarizing directions which are perpendicular to each other, said signal detecting photodetector comprises a first light receiving unit having four light receiving regions receiving said first light beam containing both the ordinary and extraordinary light components and second and third light receiving units receiving said second and third light beams, respectively, and a focusing error signal FES is detected from a difference between a sum of outputs of orthogonally aligned light receiving regions of the first light receiving unit and a sum of outputs of a second set of orthogonally aligned light receiving regions of the first light receiving unit, and an information signal is obtained from a difference between outputs of said second and third light receiving units.

5. An optical pick-up head according to claim 1, wherein an angle $\beta$ between the optic axis of the first triangular prism and the optic axis of the second triangular prism measured about the optical axis of the return beam is set to 90°, the return beam is divided into first and second light beams having polarizing directions which are perpendicular to each other and emanating from the multi-image plane parallel plate separately from each other, said signal detecting photodetector comprises first and second light receiving units each having four light receiving regions receiving respective one of said orthogonally polarized first and second light beams, an information signal is derived from a difference between a sum of the four light receiving regions of the first light receiving unit and a sum of the four light receiving regions of the second light receiving unit and a focusing error signal FES is detected from a sum of a first difference between a sum of outputs of orthogonally aligned light receiving regions of the first light receiving unit and a sum of outputs of a second set of orthogonally aligned light receiving regions of the first light receiving unit, and a second difference between a sum of orthogonally aligned light receiving regions and a sum of orthogonally aligned light receiving regions of the second light receiving unit.

* * * * *